(12) United States Patent
Sharif et al.

(10) Patent No.: US 10,791,046 B2
(45) Date of Patent: Sep. 29, 2020

(54) WEIGHTED-COST MULTI-PATHING USING RANGE LOOKUPS

(71) Applicant: Barefoot Networks, Inc., Santa Clara, CA (US)

(72) Inventors: Milad Sharif, Mountain View, CA (US); Parag Bhide, San Ramon, CA (US); Vasanth Kumar, San Jose, CA (US); Chaitanya Kodeboyina, Los Altos, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 16/108,623

(22) Filed: Aug. 22, 2018

(65) Prior Publication Data

US 2019/0190816 A1 Jun. 20, 2019

Related U.S. Application Data

(63) Continuation of application No. 15/382,711, filed on Dec. 18, 2016, now Pat. No. 10,084,687.

(60) Provisional application No. 62/423,710, filed on Nov. 17, 2016.

(51) Int. Cl.
*H04L 12/50* (2006.01)
*H04L 12/729* (2013.01)
*H04L 12/707* (2013.01)
*H04L 12/751* (2013.01)

(52) U.S. Cl.
CPC ............ *H04L 45/125* (2013.01); *H04L 45/02* (2013.01); *H04L 45/24* (2013.01)

(58) Field of Classification Search
CPC ... H04L 12/56; H04L 12/5855; H04L 45/125; H04L 45/24; H04L 45/44
USPC ................................. 370/357, 389, 400, 465
See application file for complete search history.

(56) References Cited

U.S. PATENT DOCUMENTS

| 7,110,404 B1 | 9/2006 | Temoshenko |
| 7,190,696 B1 | 3/2007 | Manur et al. |
| 8,982,700 B1 * | 3/2015 | Zhou ..................... H04L 45/125 370/229 |

(Continued)

OTHER PUBLICATIONS

Non-Published commonly owned U.S. Appl. No. 15/382,711, filed Dec. 18, 2016, 57 pages, Barefoot Networks, Inc.

(Continued)

*Primary Examiner* — Dmitry Levitan
(74) *Attorney, Agent, or Firm* — Compass IP Law PC

(57) ABSTRACT

A method of forwarding packets by a physical network switch is provided. The method assigns egress ports that connect the network switch to each particular next hop to a weighted-cost multipathing (WCMP) group associated with the particular next hop. The method assigns weights to each egress port in each WCMP group according to the capacity of each path that connects the egress port to the next hop associated with the WCMP group and normalizes the weights over a range of values. For each packet received at the network switch, the method identifies the WCMP group associated with a next hop destination of the packet. The method calculates a hash value of a set of fields in the packet header and uses the hash value to perform a range lookup in the identified WCMP group to select an egress port for forwarding the packet to the next hop.

19 Claims, 23 Drawing Sheets

(56) References Cited

U.S. PATENT DOCUMENTS

| | | | |
|---|---|---|---|
| 9,461,915 B1 * | 10/2016 | Zhou | H04L 47/125 |
| 9,502,111 B2 | 11/2016 | Dharmapurikar et al. | |
| 9,559,985 B1 | 1/2017 | Ye et al. | |
| 9,565,114 B1 | 2/2017 | Kabbani et al. | |
| 9,571,400 B1 | 2/2017 | Mandal et al. | |
| 9,608,913 B1 | 3/2017 | Kabbani et al. | |
| 9,736,067 B2 * | 8/2017 | Ye | H04L 47/12 |
| 9,876,719 B2 | 1/2018 | Revah et al. | |
| 10,015,096 B1 * | 7/2018 | Singh | H04L 47/12 |
| 10,084,687 B1 * | 9/2018 | Sharif | H04L 45/125 |
| 2002/0141403 A1 | 10/2002 | Akahane et al. | |
| 2002/0159466 A1 | 10/2002 | Rhoades | |
| 2004/0235480 A1 | 11/2004 | Rezaaifar et al. | |
| 2006/0045088 A1 | 3/2006 | Nguyen | |
| 2007/0047453 A1 | 3/2007 | Bender et al. | |
| 2007/0053283 A1 | 3/2007 | Bidwell et al. | |
| 2009/0307241 A1 | 12/2009 | Schimunek et al. | |
| 2016/0142220 A1 | 5/2016 | Hao et al. | |

OTHER PUBLICATIONS

Zhou, Junlan, et al., "WCMP: Weighted Cost Multipathing for Improved Fairness in Data Centers," EUROSYS'14, Apr. 14-16, 2014, 13 pages, ACM, Amsterdam, The Netherlands.

* cited by examiner

| TCAM Entry | Corresponding WCMP Member | [7:4] | [3:0] | Covered Range |
|---|---|---|---|---|
| 0 | 0 | 0-3 | 0-15 | 0-63 |
| 1 | 0 | 4 | 0-10 | 64-74 |
| 2 | 1 | 4 | 11-15 | 75-79 |
| 3 | 1 | 5-8 | 0-15 | 80-143 |
| 4 | 1 | 9 | 0-6 | 144-150 |
| 5 | 2 | 9 | 7-15 | 151-159 |
| 6 | 2 | 10-12 | 0-15 | 160-207 |
| 7 | 2 | 13 | 0-2 | 208-210 |
| 8 | 3 | 13 | 4-15 | 211-223 |
| 9 | 3 | 14-15 | 0-15 | 224-255 |

*Fig. 16*

| TCAM Byte | Word1 | Word0 |
|---|---|---|
| 0 | 0xFF | 0xFF |
| 1 | 0x00 | 0x0F |
| 2 | 0xFE | 0x01 |
| 3 | 0xFF | 0x00 |

*Fig. 17*

| TCAM Byte | Word1 | Word0 |
|---|---|---|
| 0 | 0x00 | 0x02 |
| 1 | 0x20 | 0x00 |
| 2 | 0xFE | 0x01 |
| 3 | 0xFF | 0x00 |

*Fig. 18*

WEIGHTED-COST MULTI-PATHING USING RANGE LOOKUPS

CLAIM OF BENEFIT TO PRIOR APPLICATIONS

This application is a continuation application of U.S. patent application Ser. No. 15/382,711, filed Dec. 18, 2016. U.S. patent application Ser. No. 15/382,711 claims the benefit of U.S. Provisional Patent Application 62/423,710, filed Nov. 17, 2016. U.S. patent application Ser. No. 15/382,711 and U.S. Provisional Patent Application 62/423,710 are incorporated herein by reference.

BACKGROUND

In a network topology there are often multiple paths to deliver a packet from one hop to the next. One technique to forward packet to the next hop is equal-cost multi-path routing (ECMP). When there are multiple equal cost paths to the next hop, a router using ECMP can increase bandwidth by load balancing network traffic over multiple paths.

A weighted-cost multi-pathing (WCMP) or weighted ECMP is a technique used for distributing network packet traffic among the next hops in proportion to the available capacity of the links between a network node and the next hop. The paths are assigned weights based on their capacity and are selected to forward packets with a probability proportional to each path's weight. Whenever a path or the associated egress port fails, the weights are updated in proportion to the capacity of the remaining paths.

A router implementing ECMP assigns an egress port to each equal-cost path and keeps the port numbers in a table. The router hashes an n-tuple in each packet header and uses the hash value as an index into the table to identify the corresponding egress port. In the past, WCMP was implemented by assigning weights to each egress path based on the path's capacity. The router maintained a table similar to the ECMP, except the entries for each port is replicated according to the weight given to the corresponding weighted path in order to select paths in proportion to how many times the associated table entries are replicated.

Since replicating entries for assigning weight can exceed the number of table entries, the table is optimized by changing the weights to reduce the number of replications needed in the table. For instance, weights of 4 and 13 in a two-path topology need 17 table entries. By changing the weights to 1 and 4 the number of table entries is reduced to 5 at the cost of introducing errors in the original weights. Other weight reduction algorithms have also been used. Nevertheless, for a large number of paths with different capacities, the number of entries can grow and optimizing the table causes large errors in the assigned weights.

BRIEF SUMMARY

Some embodiments provide a method for forwarding network traffic from a network switch to the next hop by assigning weights to the available paths to the next hop based on the capacity of each path. The paths are then selected for forwarding packets with a probability that is proportional to each of the weights assigned to the paths.

Some embodiments utilize range lookups in order to select a path for forwarding network traffic packets. These embodiments group egress ports that are used to connect the network switch to each particular next hop into a weighed-cost multi-pathing (WCMP) group associated with the particular next hop. The egress ports in each WCMP group are assigned weights based on the capacity of the egress path that connects the egress port to the next hop.

The weights in each WCMP group are then normalized into a range. The range is used to identify the egress port used to forward each incoming packet to the packet's next hop destination. For each incoming packet, the WCMP group associated with the packet's next hop is identified and a hash value of an n-tuple in the packet header is calculated.

The hash value is used to make a range lookup in the WCMP group associated with the packet's next hop and to identify an index to an egress port. The index is used to identify the egress port. If the identified egress port is operational, the egress port is used to forward the packet to the next hop. When the identified port is not operational, different embodiments use different methods to identify an operational egress port to forward the packet to the next hop. Some embodiments utilize a DIRTCAM (decoded interval range ternary content-addressable memory (TCAM)) to identify a WCMP group and perform range lookups.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 16 conceptually illustrates the ranges that are covered by each TCAM entry to implement the ranges shown in FIG. 11.

FIG. 17 illustrates trit programming for TCAM entry 0 in FIG. 16.

FIG. 18 illustrates trit programming for TCAM entry 7 in FIG. 16.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
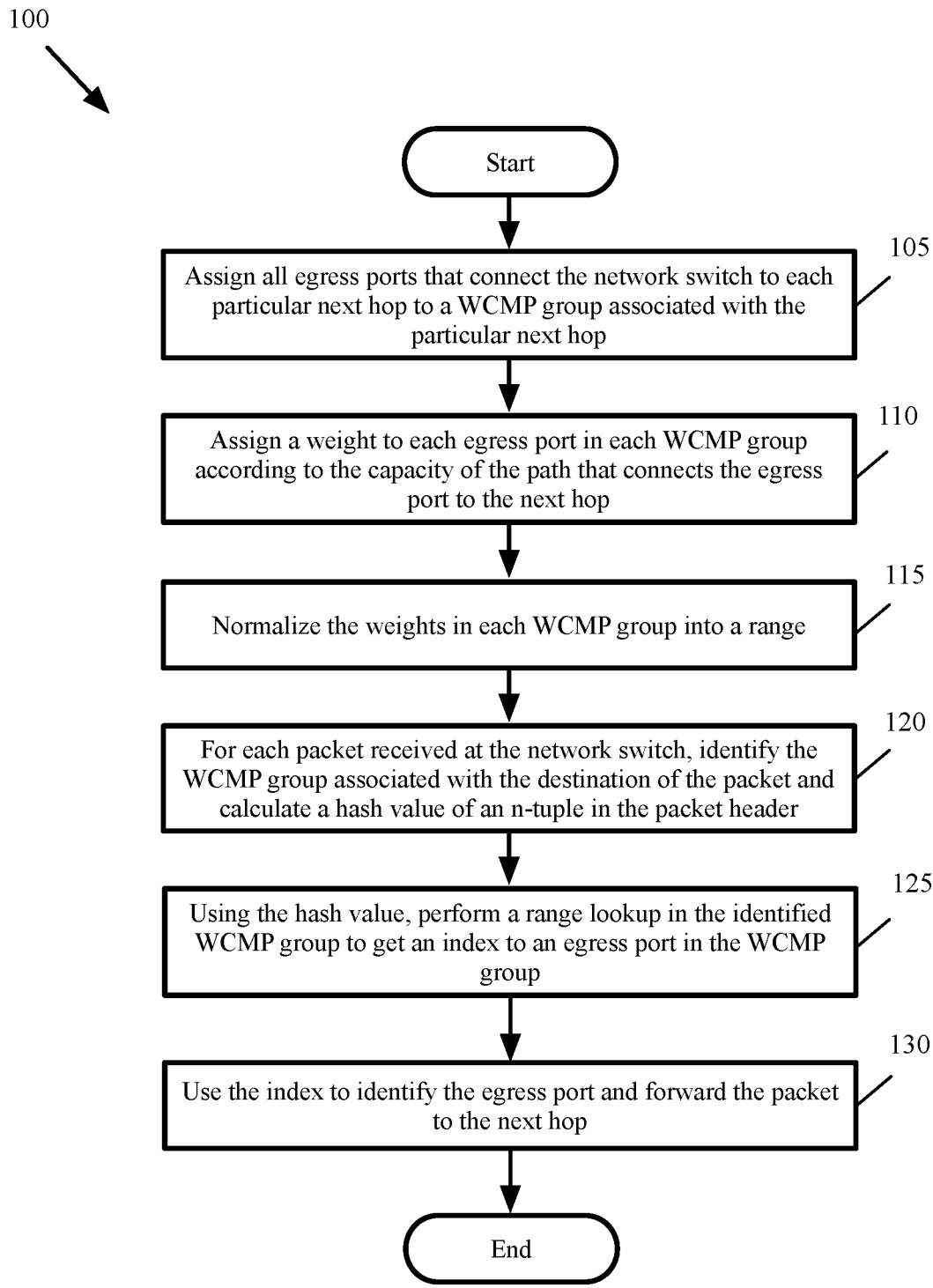
FIG. 1 conceptually illustrates a high-level process for forwarding packets to a next hop in some embodiments.

Some embodiments provide a method for forwarding network traffic from a network switch to the next hop by assigning weights to the available paths from the switch to the next hop based on the capacity of each path. The paths are then selected for forwarding packets with a probability that is proportional to each of the weights assigned to the paths. FIG. 1 conceptually illustrates a high-level process 100 for forwarding packets to a next hop in some embodiments. The process in some embodiments is performed by a network switch that is used to connect a set of network nodes to other nodes in the network.

A next hop is the next network switch (e.g., the next router) in the path of a packet from the current network switch to the packet's final destination. Each router typically identifies the next hop to each destination in a routing table. For instance, the router stores the Internet protocol (IP) address of each next hop in a routing table and uses the stored IP addresses to forwards packets to each next hop through an egress port that is connected to an egress path between the network switch and the next hop switch.

As shown, the process assigns (at 105) all egress ports that connect the network switch to each particular next hop to a WCMP group that is associated with the particular next hop. The process then assigns (at 110) a weight to each egress port in each WCMP group according to the capacity of the path that connects the egress port to the next hop. The process then normalizes (at 115) the weights in each WCMP group into a range that is used to select egress ports with probabilities according to the weights assigned to each egress port in the WCMP group.

For each packet received at the network switch, the process identifies (at 120) the WCMP group that is associated with the destination of the packet and calculates a hash value of a set of fields in the packet header. For instance, the process calculates the hash value for an n-tuple in the packet header that uniquely identifies the packet flow of the packet.

Next, the process uses the hash value to perform (at 125) a range lookup in the identified WCMP group to get an index to an egress port in the WCMP group. The process then uses (at 130) the index to identify the egress port and forward the packet to the next hop. The process then ends. Details of different operations of process 100 are described further below.

I. Forwarding of Packets to the Next Hop Using WCMP and Range Lookup

Different strategies have been developed to forward packets to the next hop to optimize the network capacity. One such strategy is equal-cost multi-path (ECMP) routing. ECMP selects a path for forwarding a packet to the next hop from a group of paths that are tied in routing metrics calculations. One of the equal cost paths is selected in a way to balance the load on different paths and minimize the overall cost (e.g., the required time or the network congestion) for forwarding the packet to the final destination.

A router implementing ECMP maintains a table (or a sub-table) for each ECMP group that connects the switch to a next hop. Each ECMP table stores the identification of the ECMP members, which are egress ports that are connected to the paths in the ECMP group. When a packet is received at the network switch, the next hop and the associated ECMP group for the packet is identified based on one or more packet header fields (e.g., the destination IP address of the packet).

A hash value of an n-tuple (e.g., source IP address, destination IP address, source port, destination port, and protocol) of the packet is then calculated. The module of the hash value over the number of ECMP paths in the ECMP group is calculated and is used as an index into the table to identify an egress port. The packet is then forwarded to the next hop using the identified egress port.

The use of ECMP, however, requires several equal cost paths to the next hop to be available and assumes that all these paths have equal costs. Factors such as downstream path failures and asymmetry in the network topology (e.g., different number of switches at different stages of the network topology) can cause imbalanced traffic distribution using ECMP.

A. Assigning Weights to WCMP Members

An improvement to ECMP is WCMP, which assigns weights to available paths to the next hop based on the capacity of each path. The paths are then selected for forwarding packets with a probability that is proportional to each of the weights assigned to the paths. In the past, WCMP was implemented by replicating ECMP members (i.e., the egress ports) in a multipath table.

Use cases for WCMP include an asymmetry in the network. For instance when there are different capacities from each node to another node, weights can be assigned to the routes in proportion to the capacity in the routes. Another use case for WCMP is a link aggregation groups (LAG). A LAG combines multiple network connections in parallel to provide throughput and redundancy. When there are port failures in the LAG group or the links have different capacities, weights can be assigned in proportion to the capacity of the links and distribute the traffic proportional to the links weights. Another use case for WCMP is for open system interconnection (OSI) Layer 4 (L4) load balancing where the L4 paths have different capacities and traffic can be distributed in proportion to weights assigned to the L4 paths.

Figure 2:
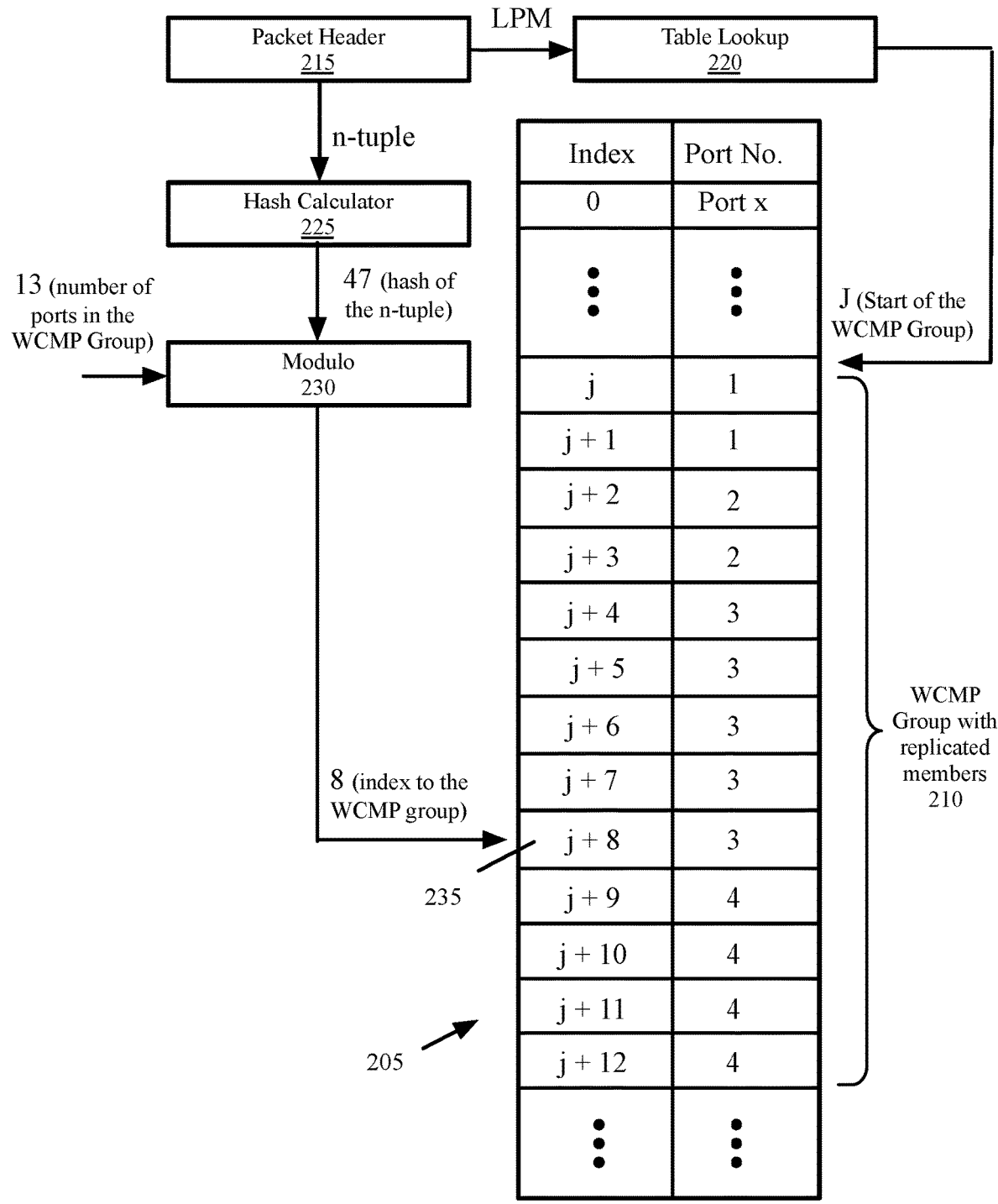
FIG. 2 illustrates a WCMP implementation according to prior art.

FIG. 2 illustrates a WCMP implementation according to prior art. In the example of FIG. 2, a weight of 2 is assigned to each of port 1 and port 2, a weight of 5 is assigned to port 3 and a weight of 4 is assigned to port 4. A table 205 similar to an ECMP table is maintained with the difference that each port entry is replicated according to the weight given to the corresponding egress port. For instance, the WCMP group 210 includes 2 entries for port 1, 2 entries for port 2, 5 entries for port 3, and 4 entries for port 4 in proportion to the ports' given weights.

As shown, when a packet arrives, the start of the WCMP group is identified by doing a table lookup 220 based on a value in the packet header 215 (e.g., the longest prefix match (LPM) in the destination IP). A hash calculator 225 calculates a hash value of an n-tuple in the packet. In this example, the calculated hash value is 47. The modulo of the hash value over the number of entries (in this example 13) in the WCMP group is calculated (as shown by 230) and the result (in this example 8) is used as an index to identify an egress port 235 in the WCMP group 210 in order to forward the packet. Further details of this method is described in "WCMP: Weighted Cost Multipathing for Improved Fairness in Data Centers," by J. Zhou, et. al, ACM EuroSys, 2014, which also describes weight reduction algorithms to reduce the number of entries in the WCMP group.

Replicating the WCMP members requires memory space. For a large WCMP group, the number of entries can grow to undesirably large numbers. Optimization algorithms reduce the number of entries but introduce inaccuracies in the assigned weights.

Figure 3:
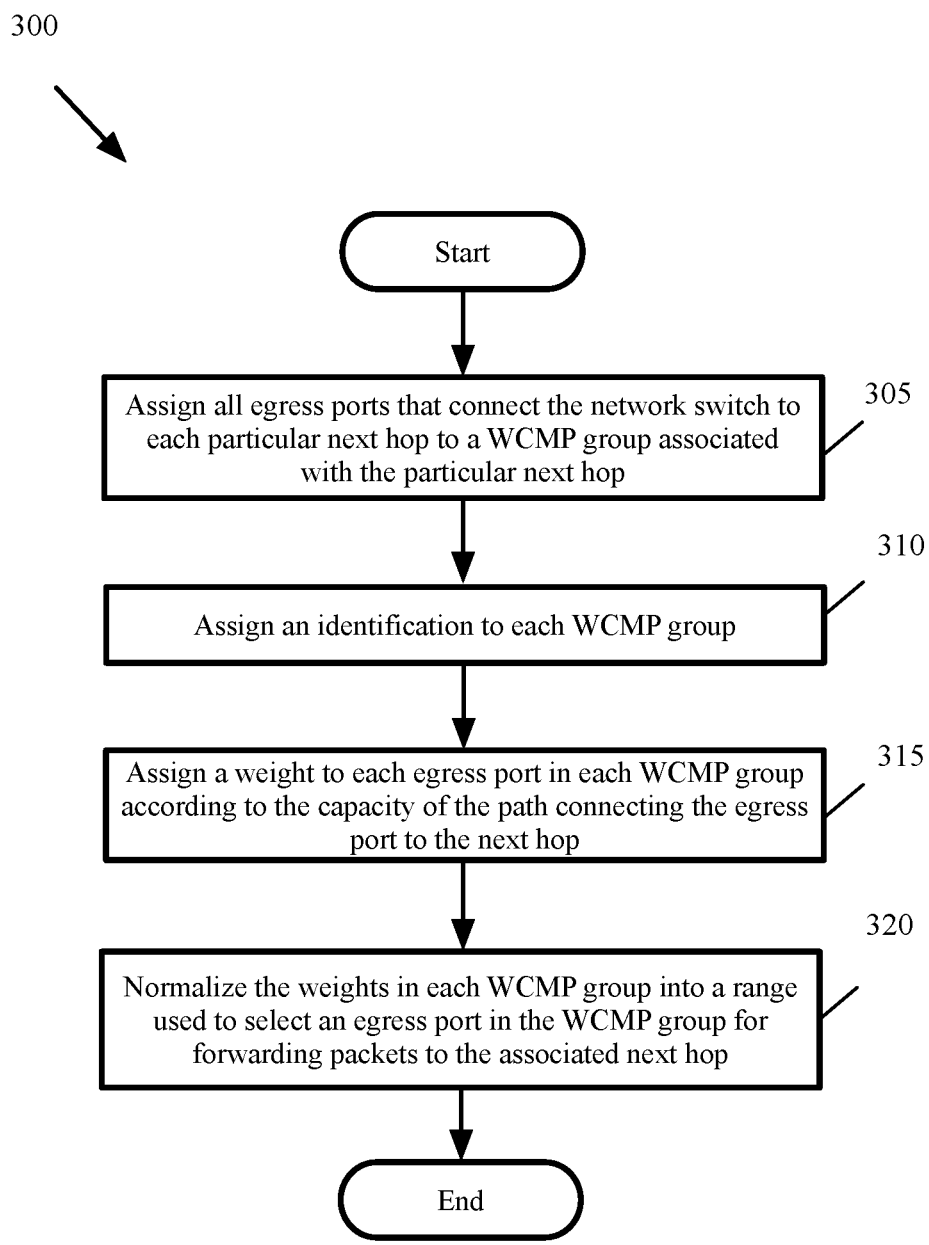
FIG. 3 conceptually illustrates a process for assigning weights to WCMP groups and normalizing the weights over a given range in some embodiments.

Some embodiments provide a novel method for performing WCMP by normalizing the weights over a range and doing a range lookup (without replicating WCMP members) to select a WCMP member (i.e., an egress port) for forwarding each packet. FIG. 3 conceptually illustrates a process 300 for assigning weights to WCMP groups and normalizing the weights over a given range in some embodiments. The process in some embodiments is performed by a network switch that is used to connect a set of network nodes to other nodes in the network. Process 300 is described in conjunction with FIGS. 4-8.

Figure 4:
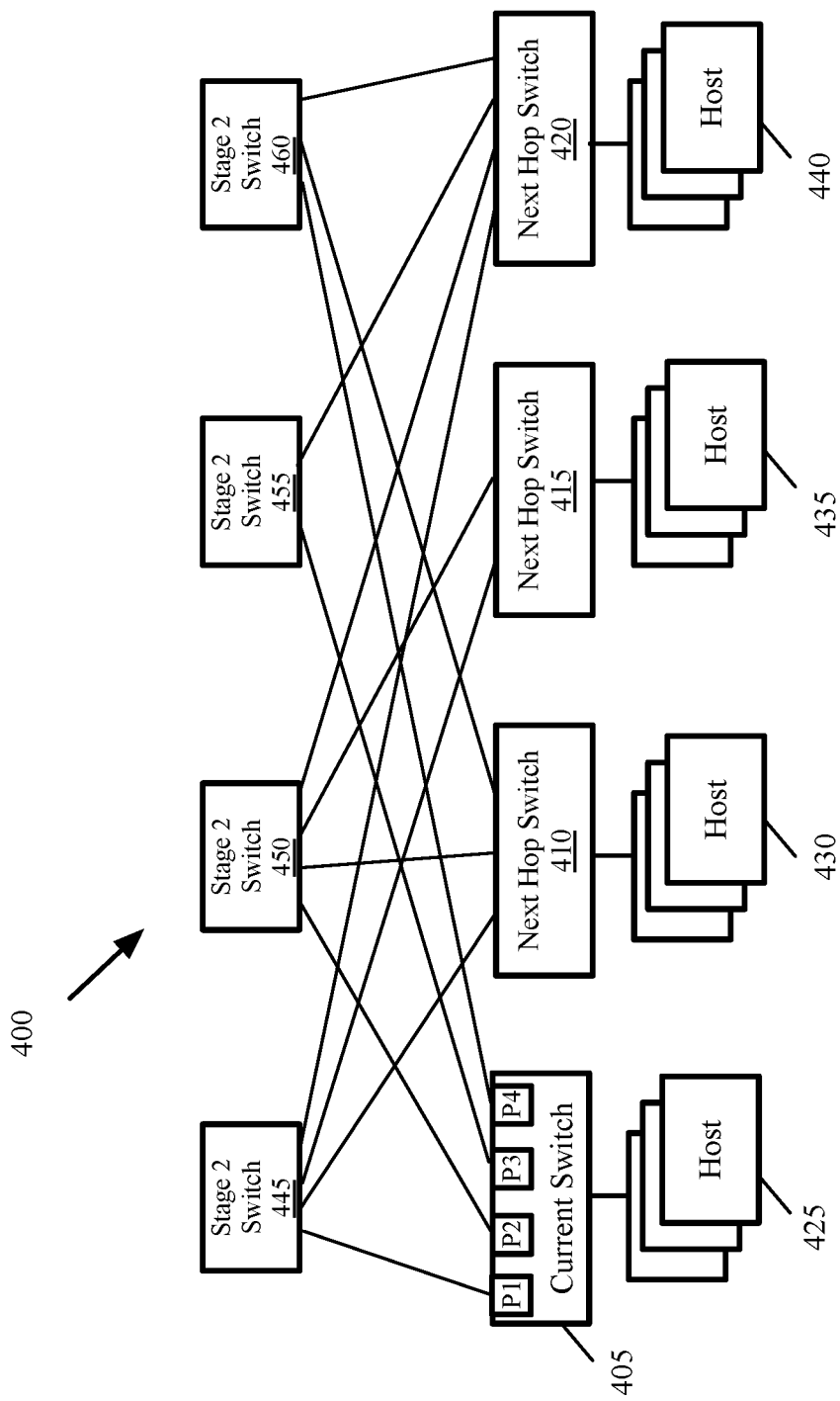
FIG. 4 conceptually illustrates a two-stage network in some embodiments.
Figure 5:
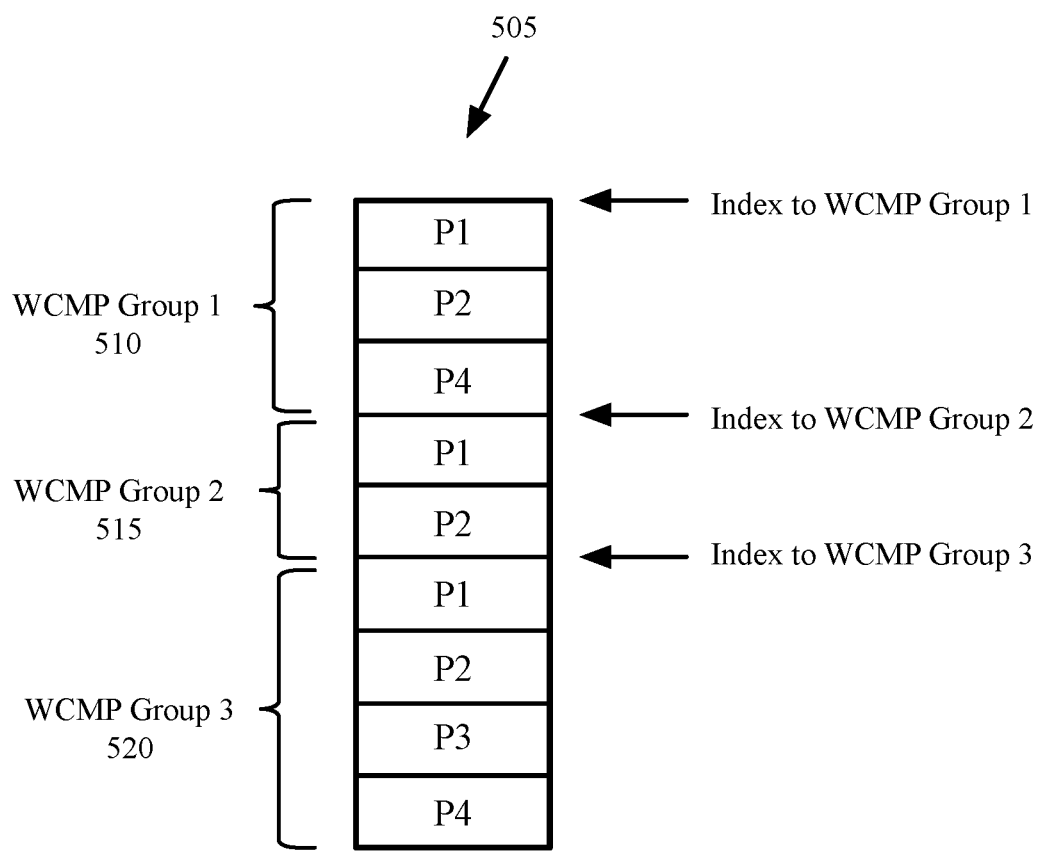
FIG. 5 conceptually illustrates the WCMP groups for the network of FIG. 4.

As shown, the process assigns (at 305) all egress ports that connect the network switch to each particular next hop to a WCMP group associated with the particular next hop. FIG. 4 conceptually illustrates a two-stage network 400 in some embodiments. FIG. 5 conceptually illustrates the WCMP groups for the network of FIG. 4. Stage 1 of network 400 includes switches 405-420. Each switch 405-420 is e.g., a router that connects one or more network nodes (e.g., network hosts 425-440) to other network nodes. Stage 2 includes switches 445-460, which are used to connect stage 1 switches 405-420 together.

The example of FIG. 4 is described from the viewpoint of network switch 405, which is referred to as the current switch. Other stage 1 switches 410-420 are referred to as next hop switches. As shown, switch 405 includes four egress ports P1-P4, which are connected to switches S1-S4 respectively.

Three WCMP groups can be identified for switch 405. The first WCMP group is associated with the next hop switch 410. This WCMP group includes all egress ports of switch 405 that connect switch 405 to next hop switch 410 through any of the stage 2 switches 445-460. The first WCMP group includes egress port P1 (which connects switch 405 to switch 410 through stage 2 switch 445), egress port P2 (which connects switch 405 to switch 410 through stage 2 switch 450), and egress port P4 (which connects switch 405 to switch 410 through stage 21 switch 460).

As shown in FIG. 5, switch 405 maintains a table 505 that stores the ports in each WCMP group. WCMP group 1 510 includes ports P1, P2, and P4, which are the egress ports in FIG. 4 that respectively connect switch 405 to switch 410 through stage 2 switches 445, 450, and 460. WCMP group 2 515 includes ports P1 and P2, which are the egress ports in FIG. 4 that respectively connect switch 405 to switch 415 through stage 2 switches 445 and 450. WCMP group 3 520 includes ports P1-P4, which are the egress ports in FIG. 4 that respectively connect switch 405 to switch 420 through stage 2 switches 445-460.

Referring back to FIG. 3, the process assigns (at 310) an identification to each WCMP group. For instance, each WCMP group 510-520 in FIG. 5 is identified by the IP address of the corresponding next hop switch 410-420 in FIG. 4. As described below, the identification of each WCMP group is used to identify an index to the beginning of the WCMP group in table 505.

Figure 6:
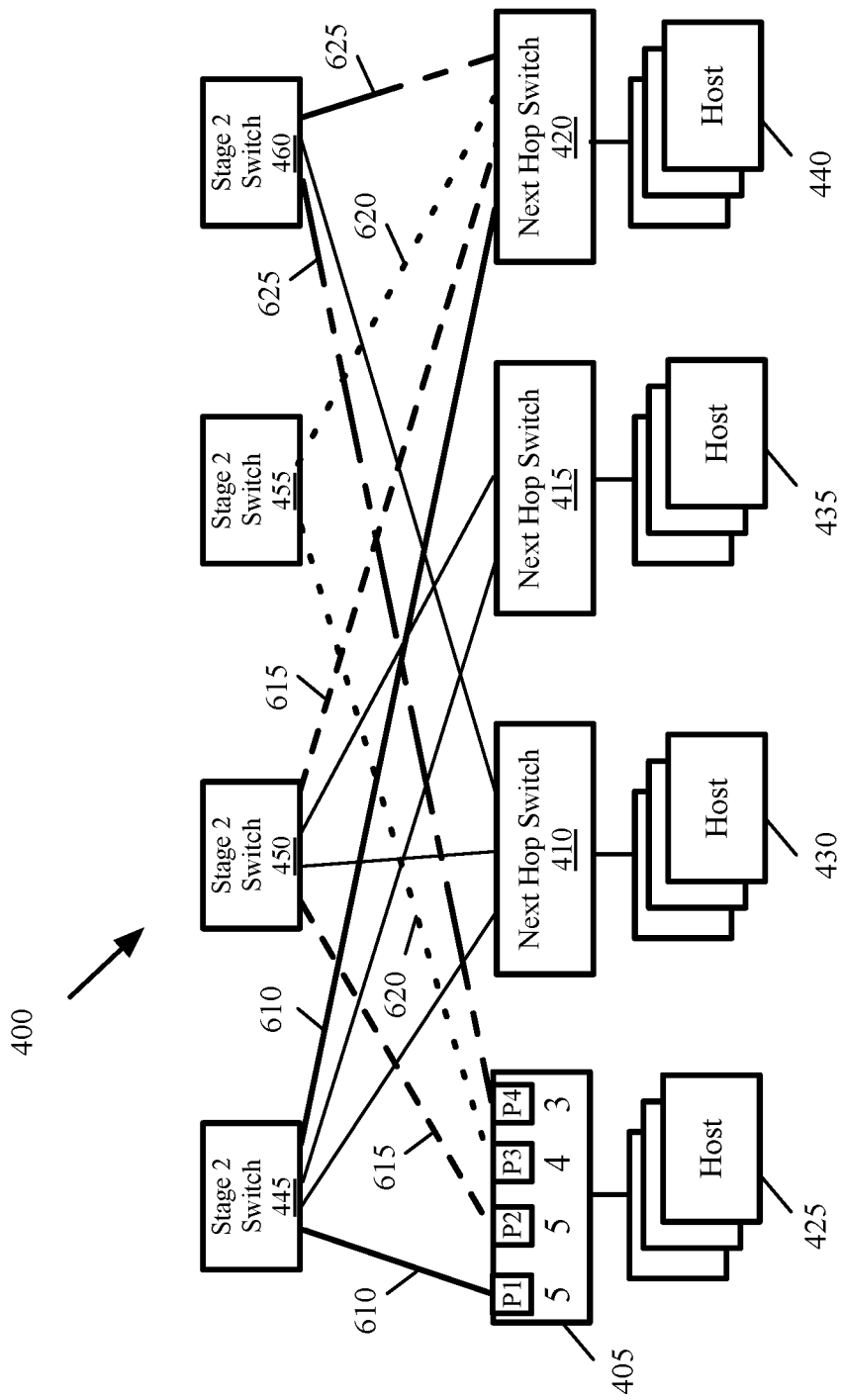
FIG. 6 conceptually illustrates assigning weights to the egress ports of the two-stage network of FIG. 4.

The process then assigns (at 315) a weight to each egress port in each WCMP group according to the capacity of the path connecting the egress port to the next hop. FIG. 6 conceptually illustrates assigning weights to the egress ports of the two-stage network 400 of FIG. 4. The example of FIG. 6 shows weights that are assigned to egress ports in WCMP group 3 520 in FIG. 5. As shown in FIG. 6, based on the capacity of the path 610 from egress port P1 to switch 420 through switch 445, the path 615 from egress port P2 to switch 420 through switch 450, the path 620 from egress port P3 to switch 420 through switch 455, and the path 625 from egress port P4 to switch 420 through switch 460, weights of 5, 5, 4, and 3 are respectively assigned to egress ports P1-P4.

Referring back to FIG. 3, the process normalizes (at 320) the weights in each WCMP group into a range that is used to select an egress port in the WCMP group for forwarding packets to the associated next hop. The value used for the range is the same as the range of a hash value that is used to select one of the egress ports in an ECMP group. For instance, for an 8-bit hash value, the range is 256 (from 0 to 255). For a 16-bit hash values, the range is 65,536 (from 0 to 65,535), etc. The range is typically selected as a power of 2 value to maximum the range utilization.

Figure 7:
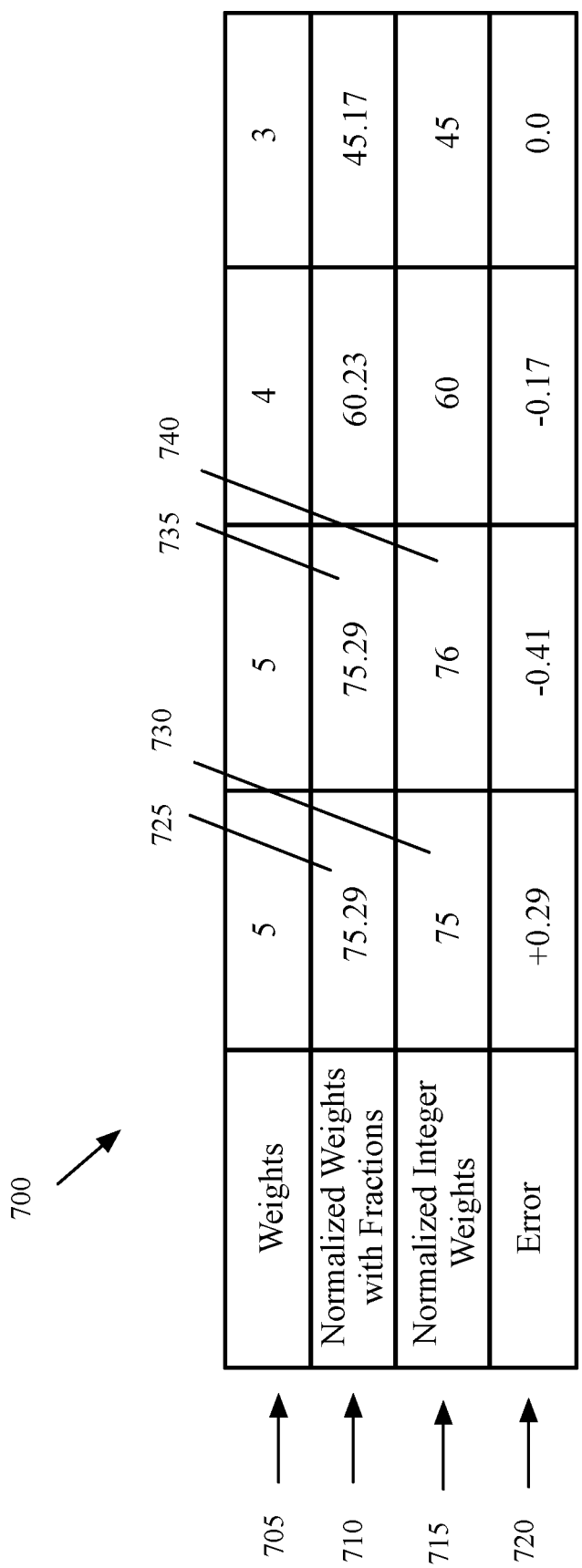
FIG. 7 conceptually illustrates normalization of the weights over a given range.

FIG. 7 conceptually illustrates normalization of the 4 weights 5, 5, 4, and 3 over a range of 256. The first row 705 shows the weights assigned to each WCMP member (or egress port). The weights are first summed up (in this example the sum is 17). The range is then proportionally divided to each weight by multiplying the weight by the range value (in this example 256) and dividing the result by the sum of the weights (in this example 17).

The second row 710 shows the normalized weights represented as real numbers with possible fractions. Some embodiments provide a method for converting the normalized weights into integer weights without introducing an error that exceeds an integer value of 1 over the entire range. For instance, for a range of 256, this method results in weight errors of less than 0.4% (i.e., 1/256).

Figure 8:
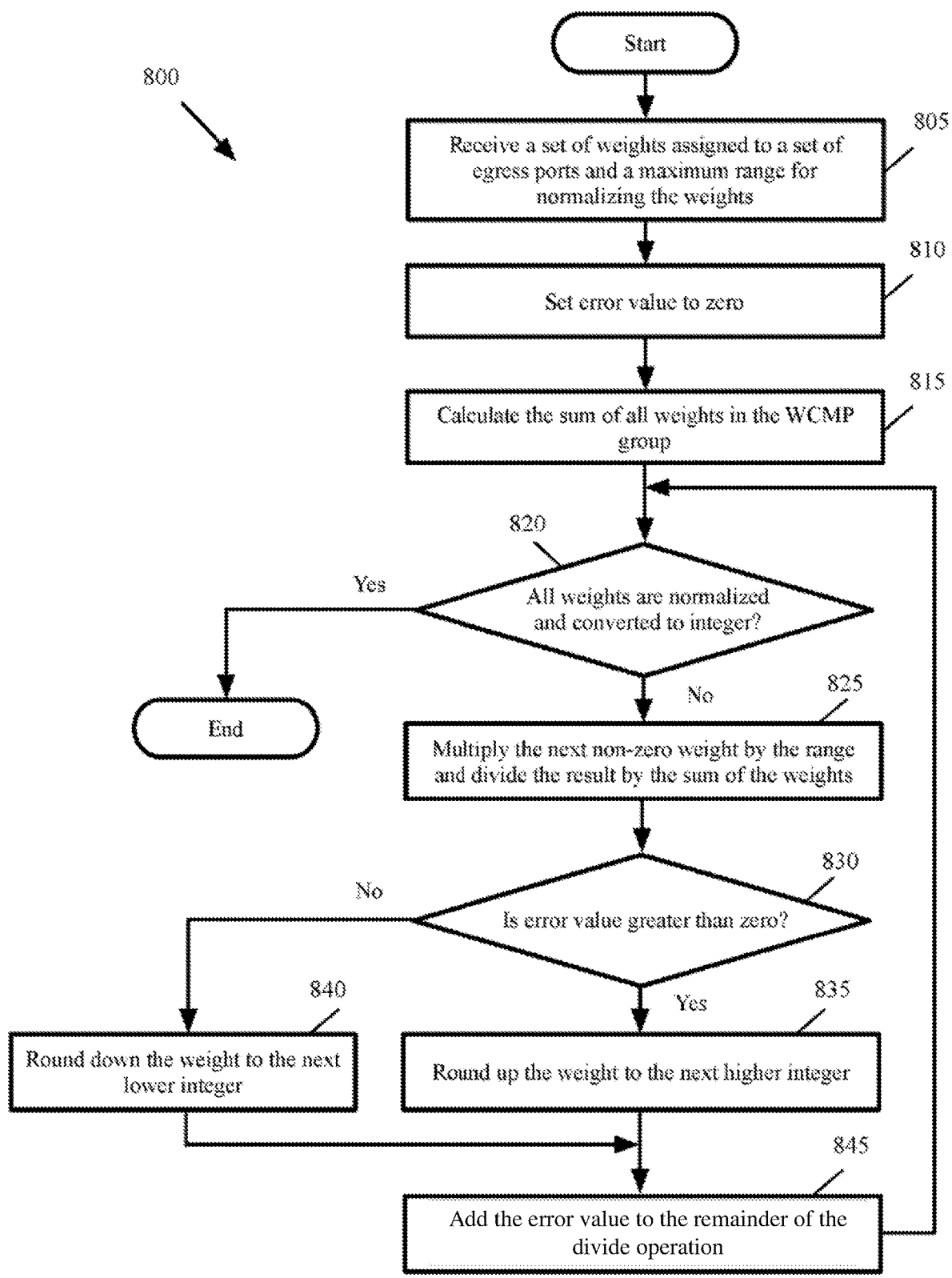
FIG. 8 conceptually illustrates a process for normalizing weights with a bounded error over a given range in some embodiments.

FIG. 8 conceptually illustrates a process 800 for normalizing weights with a bounded error over a given range in some embodiments. As shown, the process receives (at 805) a set of weights assigned to a set of egress ports and a range for normalizing the weights. For instance, the process receives weights 5, 5, 4, and 3 that are assigned to egress ports in WCMP group 3 520 (shown in FIGS. 5-7) and a range of 256 to normalizes the weights.

Next, the process sets (at 810) the value of an error value to zero. The process then calculates (at 815) the sum of all weights in the WCMP group. The process then determines (at 820) whether all weights in the WCMP group are normalized and converted to integer. If yes, the process ends. Otherwise, the process distributes the weights over the given range. As shown, the process multiplies (at 825) the next non-zero weight in the WCMP group by the range value and divides the result by the sum of the weights. If a weight is zero (i.e., the associated egress port is not operational or the path connecting the egress port to the next hop has failed), the weight is left unchanged.

The process then determines (at 830) whether the error value is greater than zero. If yes, the normalized weight is rounded up (at 835) to the next higher integer value. Otherwise, the normalized weight is rounded down (at 840) to the next lower integer value. For instance, at the beginning the error is initialized to zero (as described above by reference to 810). Therefore, the weight for the first egress port is rounded down. This is shown in FIG. 7 where 75.29 in cell 725 is rounded down to 75 in cell 730.

The process then adds (at 845) the remainder of the divide operation in 825 to the error value. The process then proceeds to 820, which was described above. As shown in FIG. 7, the error for the first egress port if +0.29 (75.29-75). For the next egress port, weight 5 is normalized to 75.29 in cell 735. Since the error is +0.29, the normalized weight is rounded up (as described above by reference to 835) to 76 in cell 740. The error is then updated to −0.41 (75.29-76). This process continues until all weights are normalized over the range and converted to integer. Since a positive error value results in rounding up the next weight and a negative error value results in rounding down the net weight, the error value never exceeds 1. The following is a snippet of code that implements the process of FIG. 8.

```
// Receive weights and range
Assignment (weights, range):
    // Initialize the error to zero
    error = 0
    sum = 0
    FOR weight in weights:
        sum += weight
    FOR weight in weights:
        int weight = (int) (weight * range / sum)
        // Round up or down based on the error
        IF (error > 0 && weight != 0)
            int_weight += 1
        error += (weight * range / sum) − int_weight;
Using the above algorithm the maximum error is 1.0/range.
```

B. Forwarding the Packets Using Range Lookup

Figure 9:
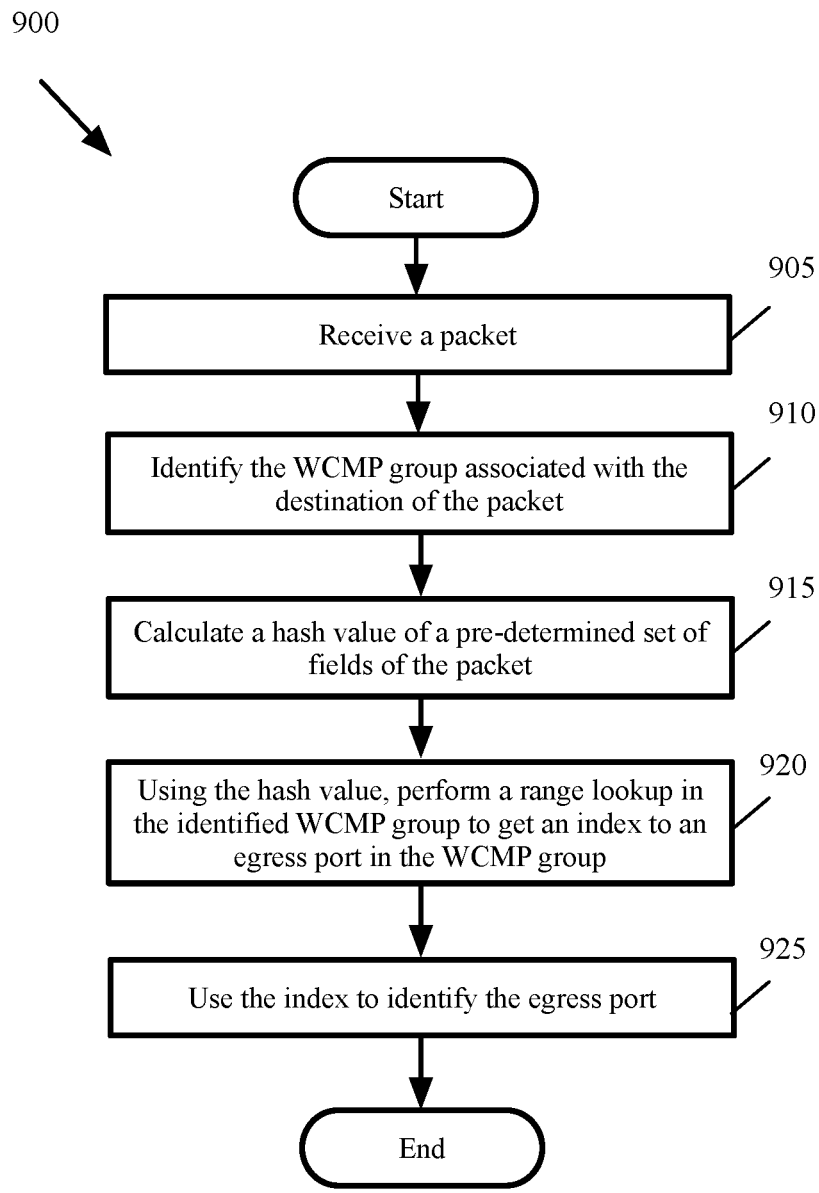
FIG. 9 conceptually illustrates a process for forwarding packets using WCMP and range lookup.

After the weights are assigned to egress ports and the weights are normalized over a range of values, the network switch performs a range lookup in order to select an egress port for forwarding the packets to their next hop. FIG. 9 conceptually illustrates a process 900 for forwarding packets using WCMP and range lookup. The process in some embodiments is performed by a network switch such as network switch 405 in FIG. 4. Process 900 is described in conjunction with FIGS. 10-11. As shown, the process receives (at 905) a packet. The process then identifies (at 910) the WCMP group associated with the next hop of the packet.

Figure 10:
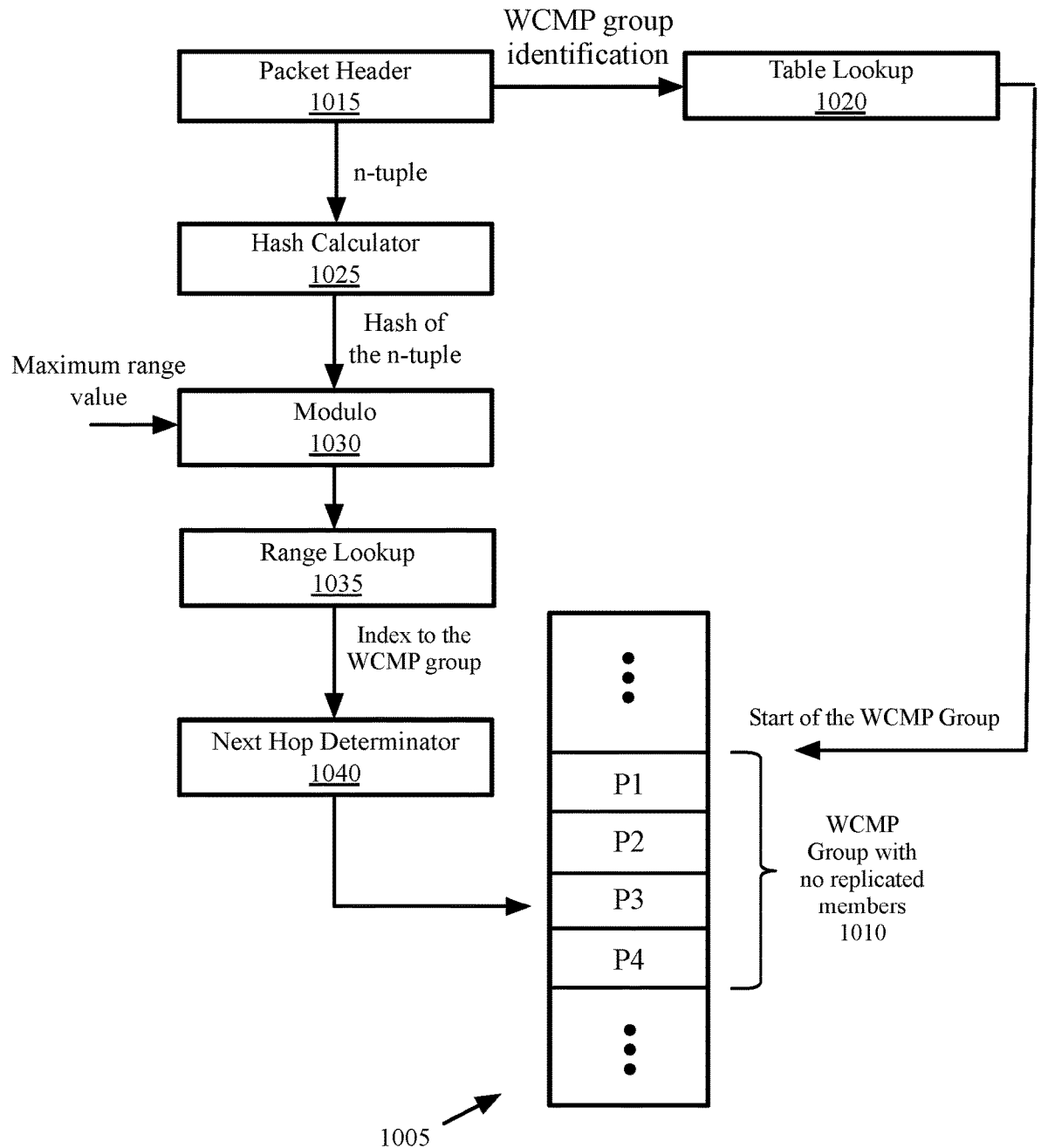
FIG. 10 conceptually illustrates a block diagram for performing different operations of the process of FIG. 9 in some embodiments.

FIG. 10 conceptually illustrates a block diagram for performing different operations of process 900 in some embodiments. The switch maintains a table 1005 for WCMP groups. Each WCMP group includes one or more egress ports. None of the WCMP groups maintained by the switch includes replicated members.

As shown, when a packet is received at the network switch, the value of one or more fields in the packet header 1015 is used to identify the WCMP group associated with the packet. Since each WCMP is associated with a next hop of the network switch, a field such as the destination IP address of the packet is used to identify the WCMP group associated with the packet. For instance, a table lookup 1020 is performed to identify the WCMP group (in this example WCMP group 1010) associated with the next hop identified based on the destination IP address of the packet. The table look up is performed based on a value in the packet header, e.g., by looking for an exact match for the destination IP address or doing LPM for the destination IP address.

Referring back to FIG. 9, the process then calculates (at 915) a hash value for a pre-determined set of fields in the packet. For instance, the process calculates the hash value of the 5-tuple of source IP address, destination IP address, source port, destination port, and protocol in the header of the packet. This 5-tuple uniquely identifies a flow associated with the packet. A flow is a sequence of packets relating to the same connection from a source network node to a destination network node.

As shown in FIG. 10, a hash calculator 1025 calculates the hash of the n-tuple of the packet header. The modulo of the hash value over the maximum range value is then calculated (as shown by 1030).

Process 900 then uses the hash value to perform (at 920) a range lookup in the identified WCMP group to get an index to an egress port in the WCMP group. The process then uses the index to identify (at 925) the egress group. The egress port is used to forward the packet to the next hop. The process then ends.

Figure 11:
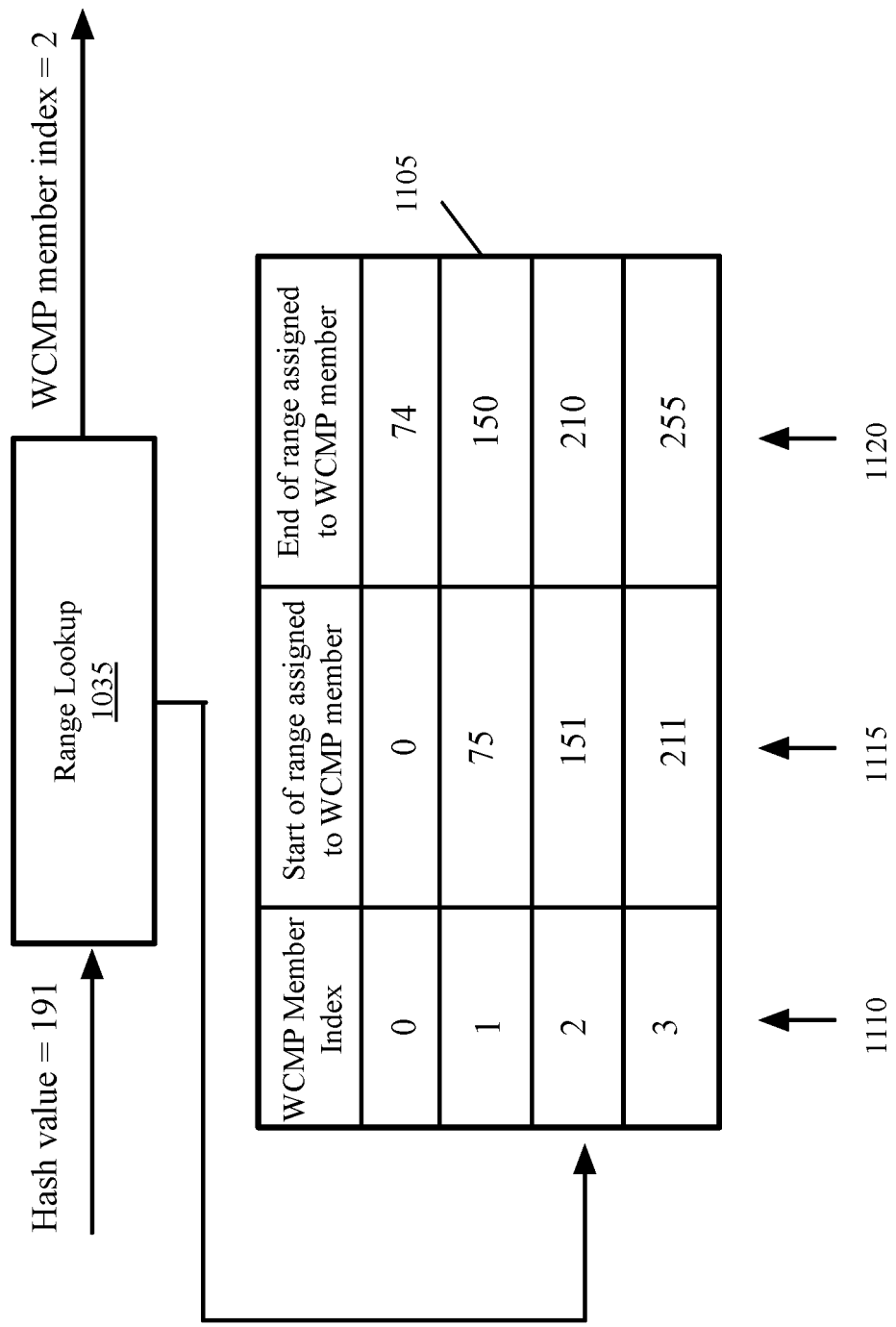
FIG. 11 conceptually illustrates performing a range lookup using the hash value modulo the maximum range value.

As shown in FIG. 10, a range lookup function 1035 performs range look up and identifies an index to an egress port using the modulo of the hash value. FIG. 11 conceptually illustrates performing a range lookup using the hash value modulo the maximum range value. As shown, the range lookup function 1035 receives the hash value (in this example the hash value is 191). The range lookup function maintains a table 1105 that identifies an index 1110 for each WCMP member, the starting value 1115 of the range assigned to the WCMP member, and the ending value 1120 of the range assigned to the WCMP member.

The range lookup function 1035 in this example determines that the hash value of 191 falls between the starting and ending values of the range assigned to WCMP member 2. The range lookup function 1035 returns the value of 2 as the index to the WCMP member.

As shown in FIG. 10, the next hop determinator 1040 receives the WCMP member index (in this example 2) and identifies the egress port P3 as the egress port to forward the packet.

1. Flow-Based Forwarding Element

Figure 12:
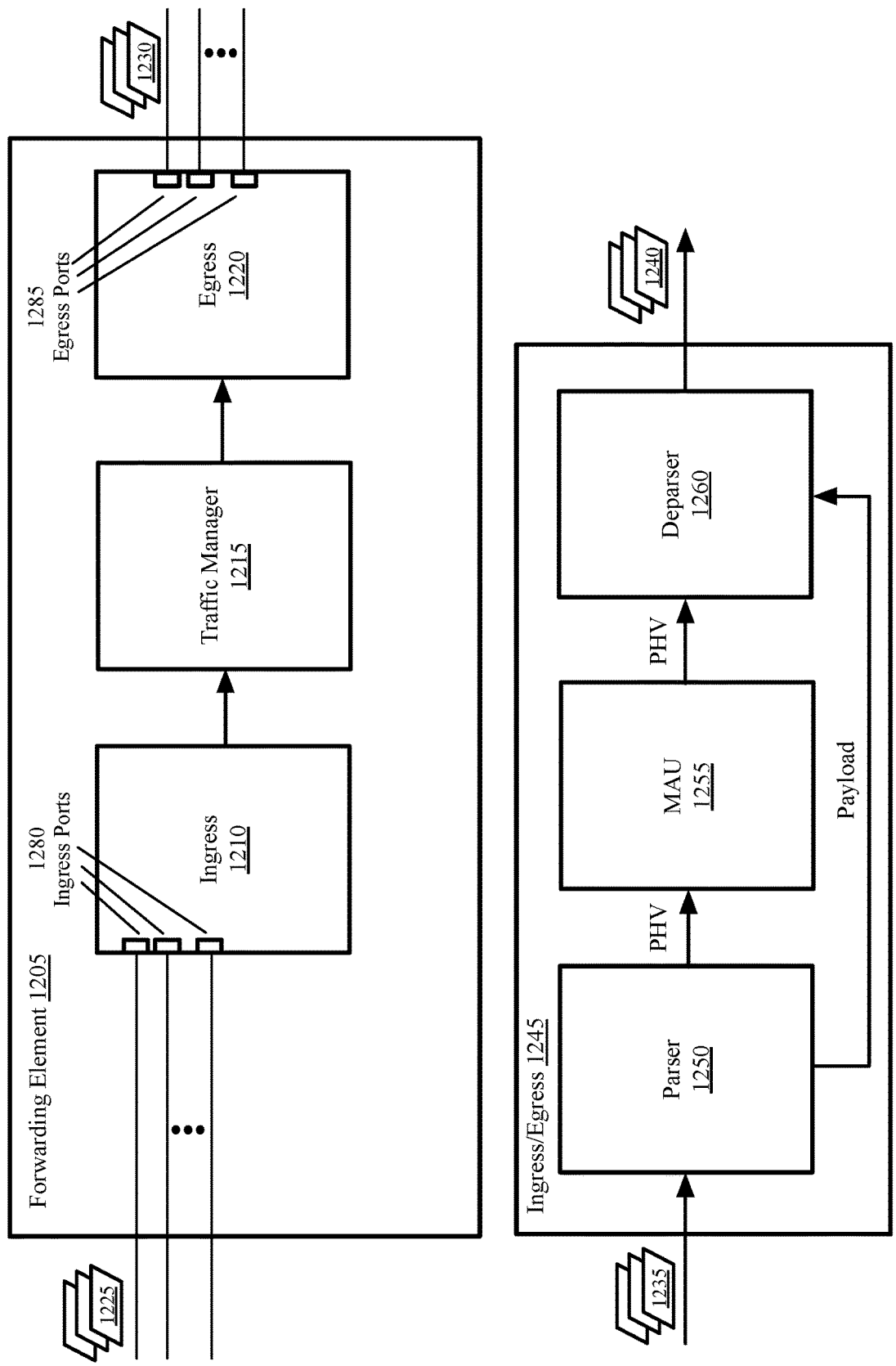
FIG. 12 conceptually illustrates a block diagram of a hardware switch or hardware forwarding element in some embodiments.

Some embodiments perform range lookup in the data plane of the network switch. FIG. 12 conceptually illustrates a block diagram of a hardware switch or hardware forwarding element in some embodiments. As shown, the forwarding element 1205 includes an ingress pipeline (or data path) 1210, a traffic manager 1215, and an egress pipeline 1220. FIG. 12 also shows a block diagram 1245 of an interface of the hardware forwarding element 1205. Each one of the ingress 1210 and egress 1220 pipelines uses an interface similar to the interface 1245. The interface includes a pipeline with three different units, namely a parser unit 1250, a match action unit (MAU) 1255, and a de-parser unit 1260.

The traffic manager 1215 in some embodiments receives the packets that are processed by the ingress pipeline and provides a large shared buffer (storage) that accommodates the queuing delays due to oversubscription of the output channels of the ingress de-parser. In some embodiments, the data buffer stores packet data, while pointers to that data are kept in different queues per channel. Each channel in turn requests data from the common data buffer using a configurable queuing policy. When pointers to packets reach the head of the queues, the packets are read out of the data buffer of the traffic manager 1215 into the egress pipeline 1220.

As shown, the ingress packets 1225 are received at the ingress pipeline 1210 through a set of ingress ports 1280. The parser 1250 of some embodiments receives the incoming packets and produces a packet header vector (PHV) as its output. In other words, the parser 1250 separates the packet headers from the packet payload by extracting different fields of packet headers and storing them in the PHV.

In some embodiments the PHV includes a set of different size registers or containers. For instance, in some embodiments the PHV includes sixty-four 8-bit registers, ninety-six 16-bit registers, and sixty-four 32-bit registers (for a total of 224 registers containing 4096 bits). Other embodiments may have any different numbers of registers of different sizes. In some embodiments, the parser 1250 stores each extracted packet header in a particular subset of one or more registers of the PHV. For example, the parser might store a first header field in one 16-bit register and a second header field in a combination of an 8-bit register and a 32-bit register (e.g., if the header field is 36 bits long).

The PHV produced by the parser provides the input data to the match tables of the MAU. In some embodiments the MAU 1255 includes a set of match-action stages (e.g., 32 match-action stages). Each of these stages matches a particular set of header fields of a packet against a match table and takes an action based on the result of the match (e.g., assigning the packet to an output port and queue, dropping the packet, modifying one or more of the header fields, etc.). Based on the actions taken on different header data during the different stages of the MAU 1255, the PHV that the MAU outputs to de-parser 1260 might include the same header data as the PHV that the MAU received from the parser 1250, or the output PHV might contain different data than the input PHV.

The output PHV is handed by the MAU 1255 to the de-parser 1260. The de-parser 1260 reassembles the packet by putting back together the output PHV (that might or might not have been modified) that the de-parser receives from the MAU 1255 and the payload of the packet that the de-parser receives directly from the parser 1250.

The de-parser then sends the packets 1240 out of the ingress/egress pipeline through a set of egress ports 1285 (to the traffic manager 1215 or out of the forwarding element, depending on whether it is the de-parser for the ingress pipeline or the egress pipeline). An output packet 1230 may be the same packet as the corresponding input packet 1225 (i.e., with identical packet headers), or it may have different packet headers compared to the input packet based on the actions that are applied to the packet headers in the ingress and egress pipelines (e.g., different header field values for certain header fields and/or different sets of header fields).

It should be understood that the illustrated blocks in forwarding element 1205 are exemplary only. The ingress, traffic manager, and egress blocks are simplified for ease of description. For example, although the figure shows only one entry point to the ingress parser and one exit point from the egress de-parser, in some embodiments the input signals are received by many different input channels (e.g., 64 channels) and the output signals are sent out of the forwarding element from different output channels (e.g., 64 channels). Additionally, although for the illustrated forwarding element only one parser interface is shown for the ingress/egress pipeline 1245, some embodiments employ numerous parser blocks (e.g., 16 parser blocks) that feed a match-action unit (MAU) in each pipeline.

The forwarding element (e.g., a switch, router, or combination thereof) of some embodiments uses the OpenFlow protocol. The network packets in some embodiments are routed to, processed by, and routed from the forwarding element according to one or more match-action tables (also referred to as flow tables) that are part of the flow table architecture of the forwarding element. The flow tables include flow entries with (i) match conditions that are compared to the headers of the packets and (ii) actions to take if a packet meets the corresponding match conditions. The flow table architecture includes various memories (e.g., unit SRAMs, TCAMs, etc.) that store the flow table data, as well as arithmetic logic units (e.g., ALUs) and other supporting circuitry.

Figure 13:
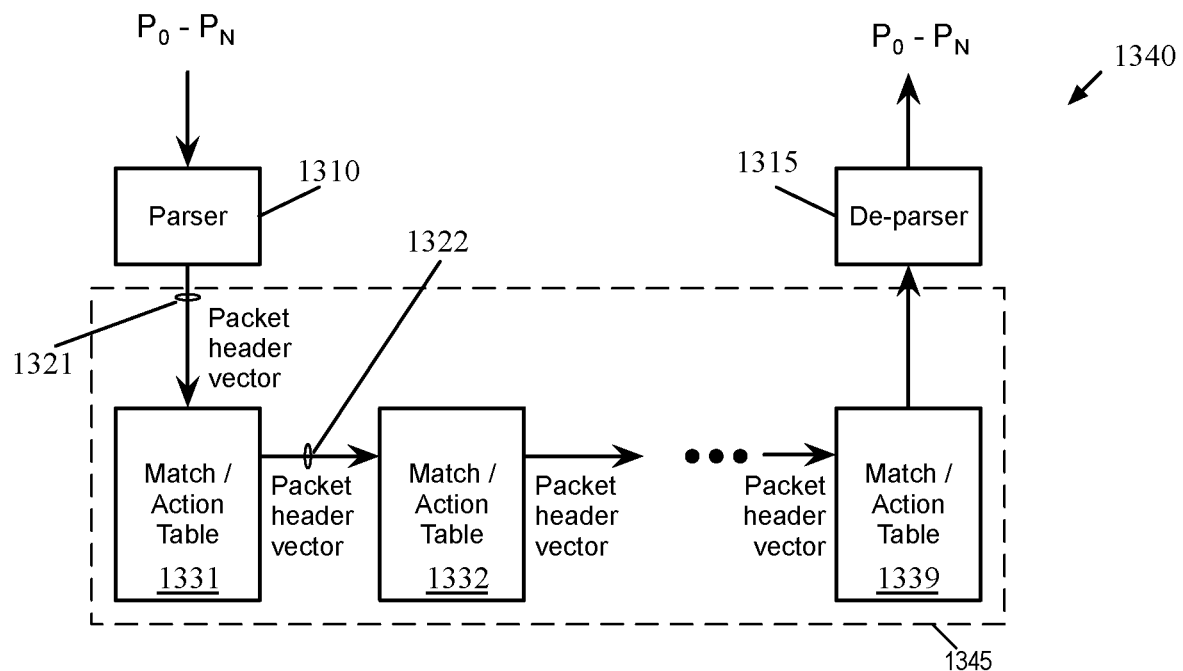
FIG. 13 conceptually illustrates the flow table architecture of a forwarding element of some embodiments.

FIG. 13 conceptually illustrates the flow table architecture 1345 of a forwarding element 1340 of some embodiments. The forwarding element includes a number of ports $P_0$-$P_N$. Each of the ports $P_0$-$P_N$ connects to a parser 1310, which parses the packet headers to create an initial packet header vector 1321. In some embodiments, the parser 1310 identifies the fields at specific locations in the packet and aligns the packet header data in a format that allows the logic units of the forwarding element hardware to identify the different header fields.

The forwarding element 1340 then submits the packet header vector 1321 to a successive sequence of match-action tables 1331-1339, which are implemented by the forwarding element (e.g., by a set of ALUs and SRAMs, or other hardware constructs). In some embodiments, the packet header vector 1321 is submitted to the first match-action table 1331 to determine whether a matching entry can be found in the table. If so, the forwarding element 1340 applies the corresponding actions to the packet, which may involve manipulating the data of the packet header vector (e.g., modifying media access control (MAC) addresses, adding or removing virtual local area network (VLAN) tags or multiprotocol label switching (MPLS) labels, decrementing the packet time-to-live (TTL), etc.), specifying to which of several possible second match-action tables the packet should be submitted, outputting the packet to a particular port, dropping the packet, etc. The forwarding element then submits a subsequent packet header vector 1322 to the next match-action table 1332, which operates in the same manner as the first table 1331. This subsequent packet header vector 1322 may be the same as the first packet header vector 1321, or may include one or more modified values based on the actions specified by the identified action from the first table 1331.

Different embodiments implement match/action table stages of the forwarding element 1340 differently. In some embodiments, selected modifications are postponed until after all match stages are executed. In some embodiments, a flow entry match specifies the address of the next table to be executed as a forward-only branch. Eventually, after all tables are consulted in this manner, the fields are presented to a de-parser 1315, which realigns the fields into a packet, which is then output to the appropriate one of ports $P_0$ through $P_N$.

2. Packet Forwarding Architecture for Implementing WCMP

Figure 14:
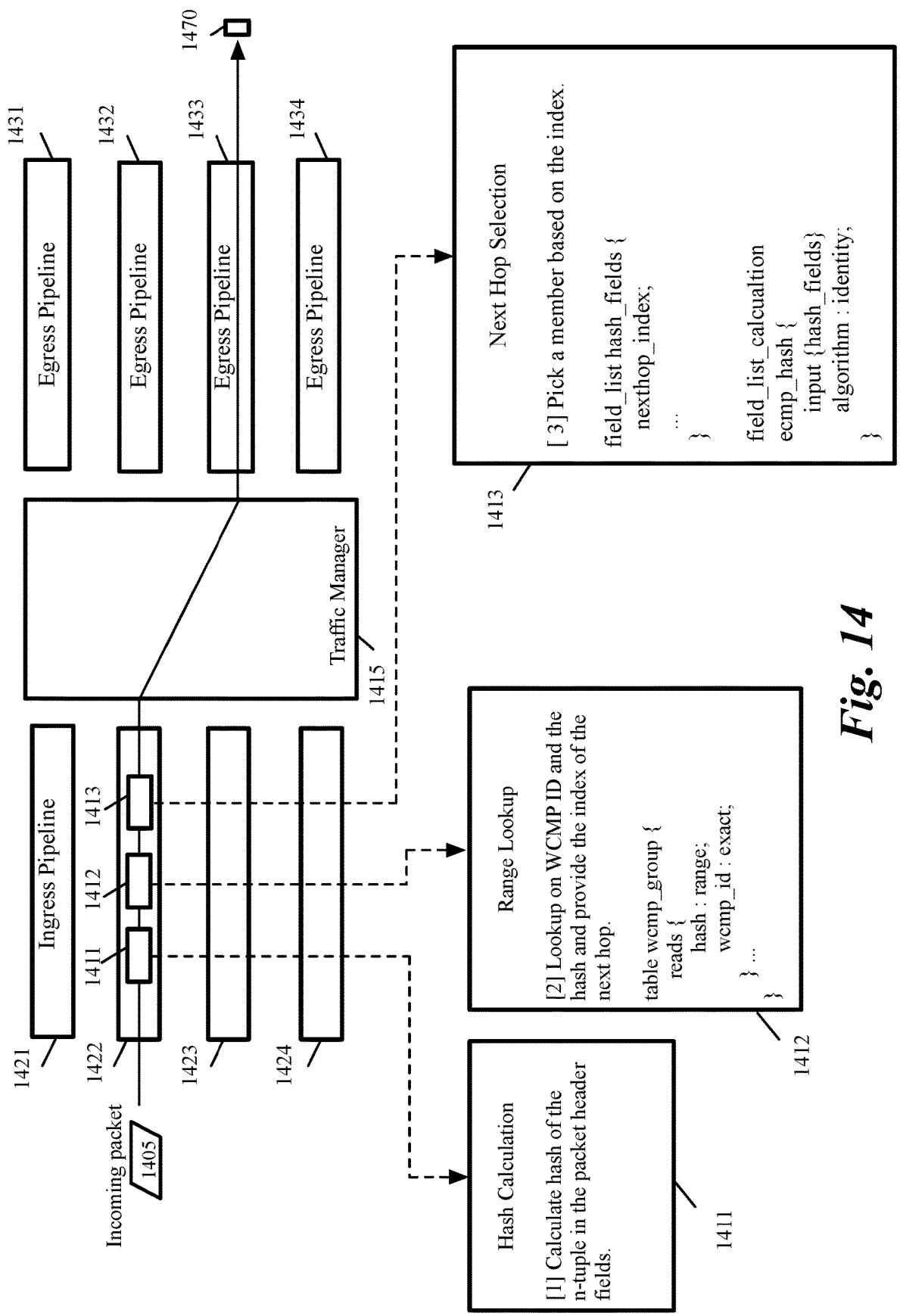
FIG. 14 conceptually illustrates performing hash value calculation, range lookup, and next hop selection in the data plane of a network switch in some embodiments.

Some embodiments perform range lookup in the data plane of the network switch. FIG. 14 conceptually illustrates performing hash value calculation, range lookup, and next hop selection in the data plane of a network switch in some embodiments. The figure shows a hardware forwarding element that includes a traffic manager 1415, several ingress pipelines 1421-1424 (each pipeline is similar to ingress pipeline 1210 in FIG. 12), several egress pipelines 1431-1434 (each pipeline is similar to egress pipeline 1220 in FIG. 12).

When a packet 1405 is received at an ingress pipeline such as pipeline 1422, the ingress pipeline performs hash calculation 1411, range look up 1412, and next hop selection 1413. Every pipeline 1421-1424 in some embodiments includes the same functions for hash calculation, range look up, and next hop selection. Every pipeline has a hash calculation function (or engine) 1411 that calculates the hash value of the n-tuple in the packet header. In some embodiments, the hash calculation function calculates the hash value (as shown by 1025 in FIG. 10), performs modulo calculation (as shown by 1030 in FIG. 10), and stores the hash value in a PHV field.

A match action unit in the ingress pipeline 1422 performs a lookup 1412 based on a header field of the packet (e.g., the destination IP field) to identify the WCMP group associated with the next hop of the packet (as shown by 1020 in FIG. 10). The action unit also performs a range look up (as shown by 1035 in FIG. 10) in the identified WCMP group by using the calculated hash value to identify the index of an egress port. The range lookup in some embodiments is performed using TCAMs as described further below.

Another match action unit in the ingress pipeline 1422 performs the next hop selection 1413 using the index provided from the previous match action unit (as shown by 1040 in FIG. 10). The packet is then forwarded to an egress pipeline 1433 that is connected to the identified egress port 1470.

3. Range Lookup Using TCAMs

Some embodiments utilize decoded interval range TCAM (or DIRTCAM) to identify a WCMP group and perform range lookups. In traditional computer memory such as random access memory (RAM), the address of data is used to retrieve content stored in the memory. Searching to determine whether a table stored in RAM includes a particular value would require repeatedly retrieving the content stored in different memory addresses, comparing the content with the value, and repeating memory accesses until either a match is found or it is determined that the table does not store the particular value.

In contrast, content-addressable memory (CAM) uses a data word to search the contents of the entire memory to determine whether the word is stored anywhere in memory. CAM allows searching the memory based on the stored content. A table stored in CAM is searched in parallel to determine whether a particular content value matches any table entries stored in memory and when one or more matches are found CAM returns a list of the storage addresses where a match is found.

In binary CAM, each bit of stored data corresponds to a binary state of 0 or 1. TCAM allows an additional state of "don't care" or "wildcard," represented as "X". For instance, an 8-bit TCAM can store a value of 01101XXX, which matches any of the values 01101000, 01101001, 01101010, 01101011, 01101100, 01101101, 01101110, and 01101111. The use of the wildcard state allows fewer entries stored in TCAM. Due to the parallel nature of TCAM, searching for content stored in TCAM is much faster than traditional RAM. However, implementing TCAM requires additional hardware components to perform parallel search, as well as masking, comparison, and priority determination. A TCAM requires 2 binary bits to represent the 0, 1, and "don't care" states of a ternary bit. As a result, TCAM is more expensive than traditional memory, consumes more power, and generates more heat that has to be dissipated. Each TCAM word stores a match pattern and provides a match output.

A DIRTCAM, in addition to receiving input search data receives range search input data bits. The range search input data bits are divided into blocks (or groups) of N bits. Within the block, intervals are represented in a decoded way inside TCAM entries and hence the name "decoded interval range TCAM (or DIRTCAM). A DIRTCAM includes a TCAM and a decoder. The decoder decodes an N bit block of search input bits into a 1-hot field of $2^N$ bits. If the input value is K, bit K of the decoder output is true and all other output bits of the decoder are false. Each word of TCAM is provided by $(2^N)/2$ TCAM bits.

For instance, the decoder provides a 1-hot field of 16 bits (i.e., $2^4$) for a 4-bit block size and the TCAM requires 8 (i.e., $(2^4)/2$) bits per word. An input value of 5 results in the $5^{th}$ bit of the decoder output to be true and all other output bit to be false. As another example, the decoder provides a 1-hot field of 4 bits (i.e., $2^2$) for a 2-bit block size and the TCAM requires 2 (i.e., $(2^2)/2$) bits per word. An input value of 3 results in the $3^1$ bit of the decoder output to be true and all other output bit to be false. DIRTCAMs are described in U.S. Patent Publication 2014/0268971, entitled "TCAM with Efficient Range Search Capability," by Patrick W. Posshart.

The following is an example of using a DIRTCAM with 4 bit block size for the search input data fields to implement range look up for the WCMP group described above by reference to FIG. 11. It should be understood that a DIRTCAM with an arbitrary block size where N is greater than 1 can be used to perform the range look up. As shown in FIG. 11, WCMP member 0 has a range of 0 to 74, WCMP member 1 has a range of 75 to 150, WCMP member 2 has a range of 151 to 210, and WCMP member 3 has a range of 211 to 255.

When the hash value that provides the range has 8 bits, 2 4-bit blocks of search input data fields are required. Each word of the TCAM requires 8 bits for range search (i.e., 8*2 or 16 bits for the 2 4-bit blocks). Furthermore, for a WCMP identifier in the range of 0 to $2^M$, an additional M bits per TCAM word is required for WCMP ID look up. For instance, for a WCMP ID in the range of 0 to 65,535 (i.e., $2^{16}$), 16 additional bits per TCAM word is required. In this example, the WCMP identification 0x0001, where 0x denotes a hexadecimal value. It should be understood that for 16 bits per word of TCAM allocated to WCMP ID, WCMP identification can be any value 0 to 65,535.

Figure 15:
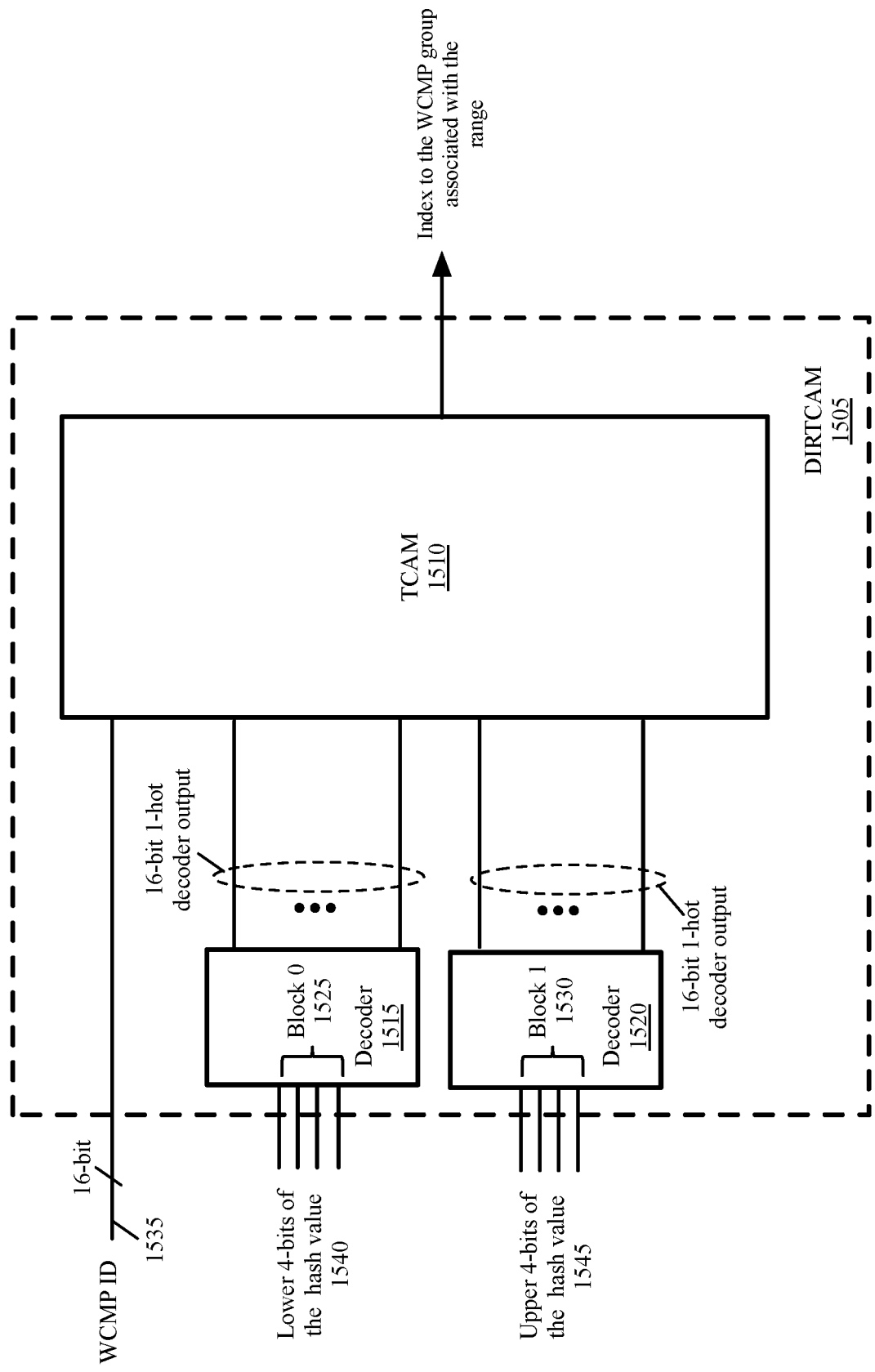
FIG. 15 conceptually illustrates a DIRTCAM that is used to perform WCMP ID and range lookups in some embodiments.

In the above example of an 8-bit hash value and a 4-bit block for DIRTCAM, each word of TCAM requires 32 bits (i.e., 16 bits to store the range match pattern for the 2 4-bit search blocks and 16 bits to store the match pattern for the WCMP ID). FIG. 15 conceptually illustrates a DIRTCAM that is used to perform WCMP ID and range lookups in some embodiments. As shown, the DIRTCAM 1505 includes a TCAM 1510 and two decoders 1515-1520.

The DIRTCAM in this example is configured to include two 4-bit blocks 1525 and 1530. Each decoder 1515-1520 is configured to provide 16 (i.e., $2^4$) 1-hot output for one of the 4-bit blocks. In addition to the 32 bits of input from the decoders 1515-1520, DIRTCAM 1505 receives 16 bits of input 1535 for WCMP ID.

TCAM 1510 is configured to allocate 32 bits per word for storing the search pattern (8*2=16 bit) and WCMP ID (16 bits). The TCAM has two sets of search inputs, search0 and search1. For searching for a data value D, D is presented to search1, while the bitwise complement of D (not D) is presented to search0. Each search input may have 32 bit or more. For instance, each search input in some embodiments may have 44 bits. The outputs of each decoder are divided into 2 8-bit outputs. Each decoder output drives a byte of search1 and a byte of search0. The upper byte output drives a byte of search1 and the lower byte output drives a byte of search0. Individual bits connected to search0 and search1 of TCAM 1510 are not shown for simplicity.

In order to implement the ranges in the example of FIG. 11, TCAM 1510 requires 10 entries. FIG. 16 conceptually illustrates the ranges that are covered by each TCAM entry to implement the ranges shown in FIG. 11. Table 1600 includes 10 TCAM entries 1605. The table shows the covered 1625 by each TCAM entry 1605, the corresponding WCMP member 1610, and the bit values 1620 and 1615 that are valid for the lower 4-bits and upper 4-bits of the hash value, respectively (i.e., the lower 4-bits 1540 and upper 4-bits 1545 of the hash value shown in FIG. 15).

For instance, TCAM entry 0 corresponds to WCMP member 0 and stores the search pattern for range values of 0-63. The valid values for the lower 4-bit block are 0-15 and the valid values for the upper 4-bit block are 0-3. The followings explain how the valid values are derived for 1630-1635 entries in table 1600. Using 8-bits to represent values between 0 to 63 corresponds to bit values 00000000 to 00111111. Therefore, the lower four bits 1630 would have values from 0000 to 1111 (or 0 to 15 decimal). The upper bits 1635 would have values from 0000 to 0011 (or 0 to 3 decimal).

Similarly, TCAM entry 1 1655 corresponds to WCMP member 0 and stores the search pattern for range values of 64-74. The valid values for the lower 4-bit block are 0-10 and the only valid value for the upper 4-bit block is 4. The followings explain how the valid values are derived for 1640-1645 entries in table 1600. Using 8-bits to represent values between 64 to 74 corresponds to bit values 01000000 to 01001010. Therefore, the lower four bits 1640 would have values from 0000 to 1010 (or 0 to 10 decimal). The only valid value of upper bits 1645 is 0110 (or 4 decimal).

As another example, TCAM entry 7 1650 corresponds to WCMP member 2 and stores the search pattern for range values of 208-210. The valid values for the lower 4-bit block are 0-3 and the only valid value for the upper 4-bit block is 13. The followings explain how the valid values are derived for 1640-1645 entries in table 1600. Using 8-bits to represent values between 208-210 corresponds to bit values 11010000 to 11010010. Therefore, the lower four bits 1660 would have values from 0000 to 0010 (or 0 to 2 decimal). The only valid value of upper bits 1665 is 1101 (or 13 decimal). Other entries for columns 1615 and 1620 are driven similarly.

FIGS. 17-18 conceptually illustrates examples of the trit programming of TCAM 1510 in FIG. 15 to implement the ranges in FIG. 16. FIG. 17 illustrates trit programming for TCAM entry 0 1645 in FIG. 16. FIG. 18 illustrates trit programming for TCAM entry 7 1650 in FIG. 16. Each TCAM entry consumes 32 bits (4 bytes). The first two bytes correspond to hash value (8 bits) and the third and fourth bytes correspond to the WCMP ID (16 bits). The WCMP ID in the example of FIG. 17 is 1. It should be understood that when 16 bits are used to represent WCMP ID, any values from 0 to 65,535 can be used for WCMP ID.

FIG. 17 shows the values for each byte 1705 for word0 1715 and word1 1710 of the TCAM entry 0. Byte 0 and 1 of each word 1710-1715 stores the corresponding value for the range. Byte 2 and 3 of each word 1710-1715 stores the corresponding value for the WCMP ID.

Table 1600 specifies that entry 0 of TCAM is configured to have a range of 0-15 for the lower 4-bit block and a range of 0-3 for the upper 4-bit block. Converting these values to 1-hot bit values and using 16 bits (8 bytes per bytes), value of 15 is represented by 1000000000000000 (i.e., the 15$^{th}$ bit) and value of 3 is represented by 0000000000001000 (i.e., the 3$^{rd}$ bit). Breaking the 16-bit value 1000000000000000 into 2 8-bit bits results in a value of 0xFF for word0, byte0 and a value of 0xFF for word1, byte0 (i.e., all values are valid). Similarly, breaking the 16-bit value 0000000000001000 into 2 8-bit bytes results in a value of 0x0F for word0, byte1 and a value of 0x00 for word1, byte0. Word0, byte2 and word0, byte 3 store 0x01 and 0x00 that correspond to a value of 1 for WCMP identifier. word1 byte2 and word1, byte3 are complement of word0 byte2 and word0, byte3 to provide for an exact match search pattern.

FIG. 18 shows the values for each byte 1805 for word0 1815 and word1 1810 of the TCAM entry 7. Byte 0 and 1 of each word 1810-1815 stores the corresponding value for the range. Byte 2 and 3 of each word 1810-1815 stores the corresponding value for the WCMP ID. Table 1600 specifies that entry 7 of TCAM is to be configured to have a range of 0-2 for the lower 4-bit block and a value of 13 for the upper 4-bit block.

Converting these values to 1-hot bit values and using 16 bits (8 bytes per bytes), value of 2 is represented by 0000000000000010 and value of 13 is represented by 001000000000. Breaking the 16-bit value 0000000000000010 into 2 8-bit bytes results in a value of 0x02 for word0, byte0 and a value of 0x00 for word1, byte0. Similarly, breaking the 16-bit value 0010000000000000 into 2 8-bit bits results in a value of 0x00 for word0, byte1 and a value of 0x20 for word1, byte0. Word0, byte2 and word0, byte 3 store 0x01 and 0x00 that correspond to a value of 1 for WCMP identifier. word1 byte2 and word1, byte3 are complement of word0 byte2 and word0, byte3 to provide for an exact match search pattern.

C. Robust Hashing

When a WCMP member fails, for instance when an egress port in a WCMP group fails or a path connecting an egress port to a next hop fails, the traffic cannot go through that egress port. In order for the hashing to be robust, only the traffic that was going through the failed egress port should be reshuffled. The flows there were going through other egress ports of the WCMP group should continue to go through the same egress ports.

Different embodiments have different methods for providing robust hashing. In some embodiments, the control plane removes the failed port from the WCMP range, updates the weights for the remaining egress ports, and redistributes the range among the remaining egress ports based on the updated weights. In other embodiments, the hardware in the data plane of the network switch (e.g., the match action units of the ingress pipeline) quickly finds a replacement egress port to redistribute the traffic without redistributing the range among remaining egress ports. The control plane (i.e., the software) of the network switch performs the range redistribution at a later time.

Figure 19:
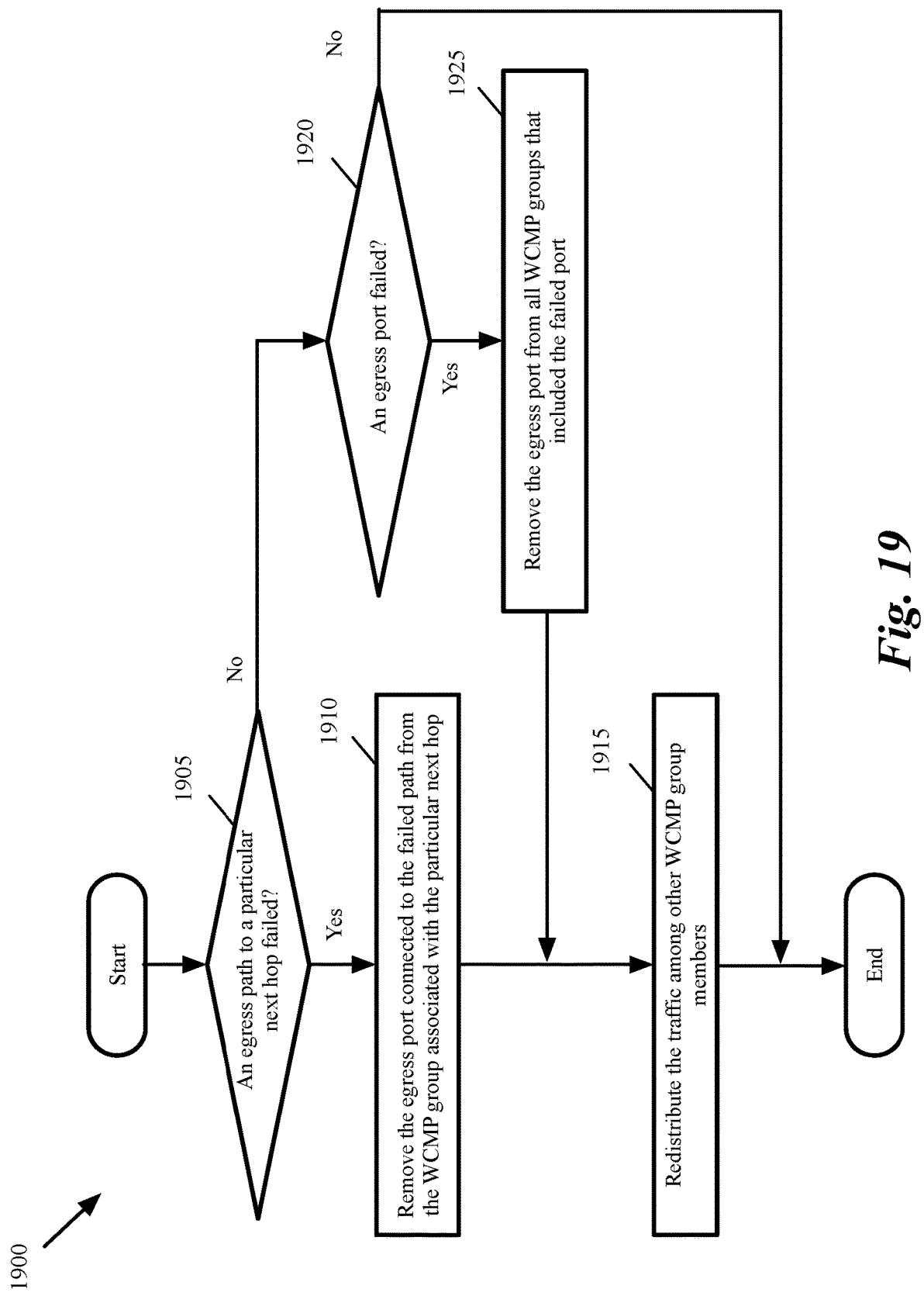
FIG. 19 conceptually illustrates a process for removing an egress port from one or more WCMP groups in some embodiments.
Figure 20:
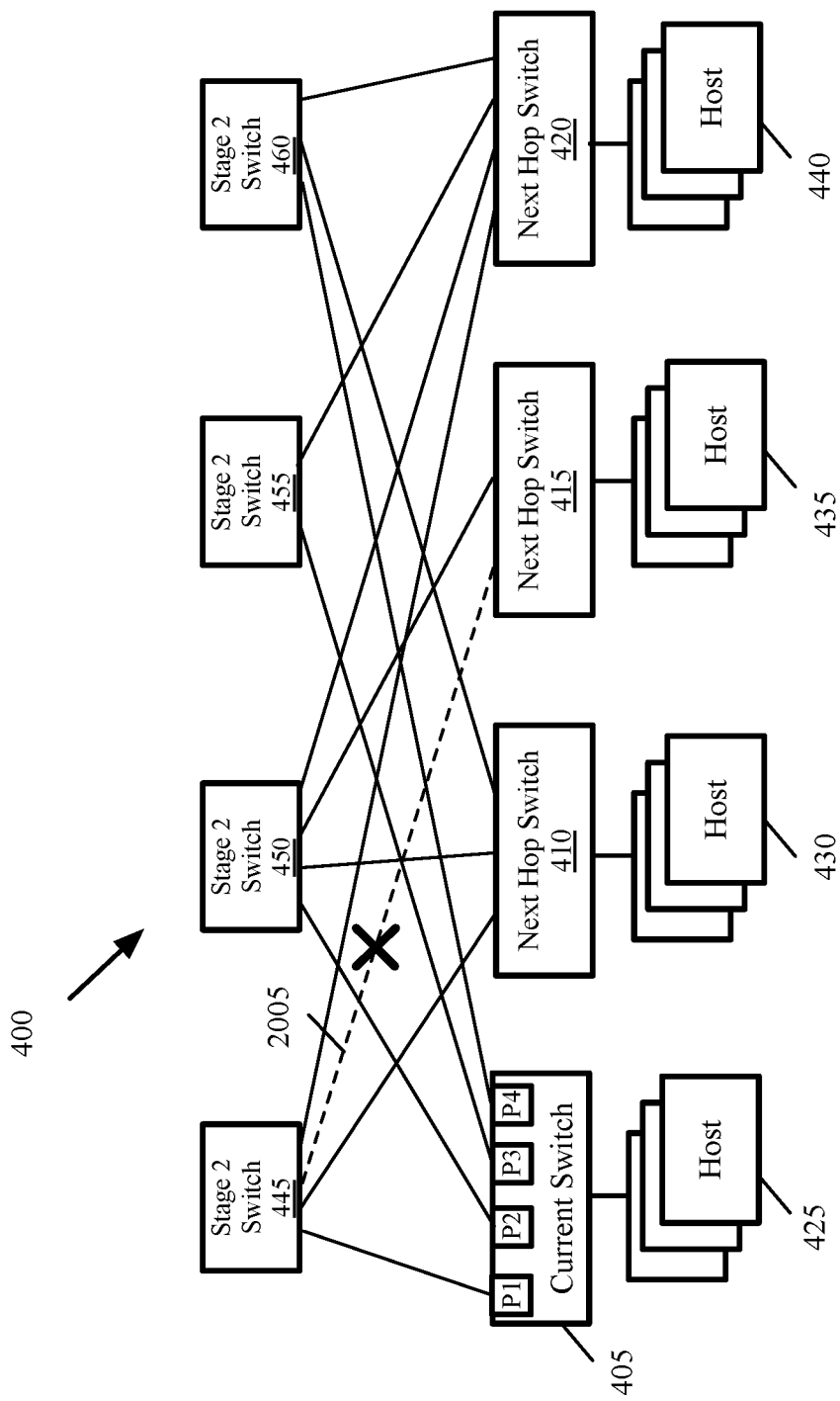
FIG. 20 conceptually illustrates the two-stage network of FIG. 4 where a path between a stage 2 switch and a next hop switch has failed.

FIG. 19 conceptually illustrates a process 1900 for removing an egress port from one or more WCMP groups in some embodiments. As shown, the process determines (at 1905) whether a path to a particular next hop has failed. FIG. 20 conceptually illustrates the two-stage network 400 of FIG. 4 where a path 2005 between a stage 2 switch 445 and a next hop switch 415 has failed. As a result, port P1 is removed from the WCMP group 2 515 shown in FIG. 5. Port P1 is the egress port in FIG. 4 that connects switch 405 to switch 415 through stage 2 switches 445 and the failed path 2005.

If no egress path has failed, the process proceeds to 1920, which is described below. Otherwise, the process removes (at 1910) the egress port connected to the failed path from the WCMP group associated with the particular next hop. The process then redistributes (at 1915) the traffic among other WCMP group members. The process then ends. Several different methods of redistributing the traffic among other WCMP members are described below.

Figure 21:
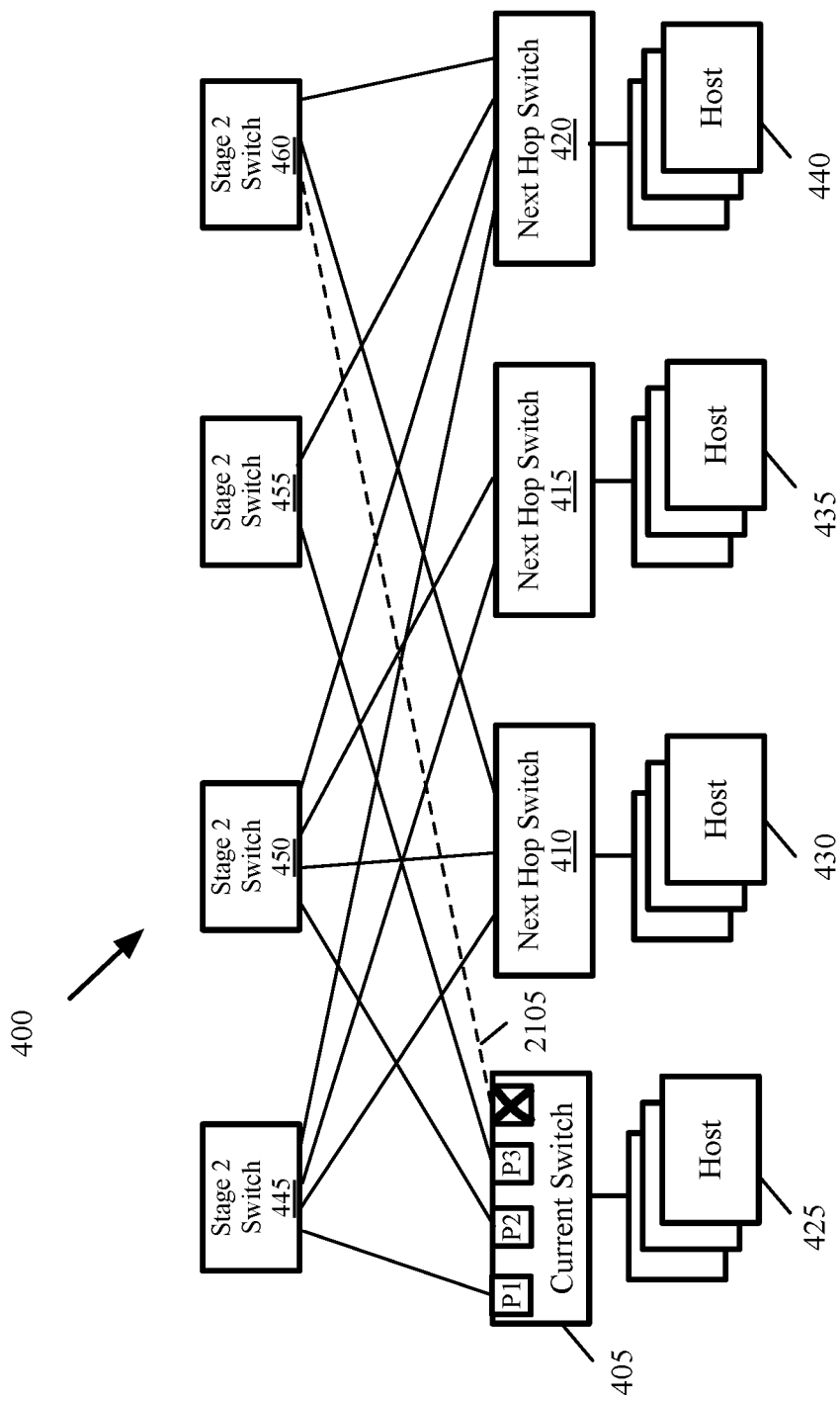
FIG. 21 conceptually illustrates the two-stage network of FIG. 4 where an egress port has failed.

At 1920, the process determines whether an egress port has failed. FIG. 21 conceptually illustrates the two-stage network 400 of FIG. 4 where egress port P4 has failed. As a result port P2 is removed from WCMP group 1 510 and WCMP group 3 520 in FIG. 5.

If no egress port has failed, the process ends. Otherwise, the process removes (at 1925) the failed egress port from all WCMP groups that included the failed port. The process then proceeds to 1915, which was described below.

Some embodiments maintain a flow table and whenever a range lookup for a flow is performed, the egress port associated with the flow is stored in the flow table. When a packet of the same arrives, only the flow table is searched. When an egress port fails, the port is removed from the flow table, the weights for the remaining egress ports are adjusted, and the weights are normalized over the maximum range value.

Figure 22A:
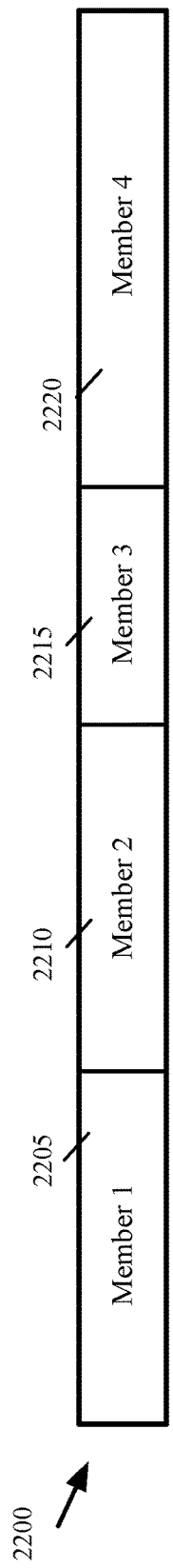
FIGS. 22A-22D conceptually illustrate range assignments to a WCMP group members in some embodiment.

Some embodiments use a smart range assignment method to reassign the range used by a failed port. FIGS. 22A-22D conceptually illustrate range assignments to a WCMP group members in some one embodiment. As shown in FIG. 22A, range 2200 is divided between four members 2205-2220 according to the weights assigned to each member.

Figure 22B:

In FIG. 22B, member 2 2210 has failed and is removed from the range. The range assigned to member 2 2210 is redistributed among other 3 members without changing the existing ranges of the remaining three members. As shown, different portions 2225-2235 of the previous range of member 2 2210 is reassigned to members 1, 2, and 4.

Figure 22C:
Figure 22D:
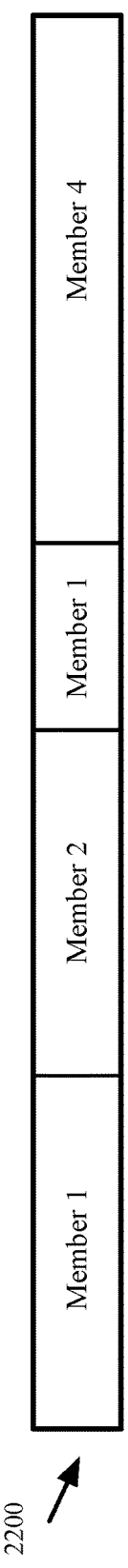

In FIG. 22C, member 3 has also failed and the portions 2215 and 2230 of the range are reassigned to the remaining two members without changing the existing ranges of these members. In FIG. 22D, member 2 has become operational again. The original range 2210 of member 2 is reassigned to this member.

Some embodiments utilize the hardware in the data path of the network switch to perform robust hashing. Some embodiments calculate a long hash value (e.g., a 52-bit hash value) and the hardware picks different part of the hash to make different attempts to find an operational port to replace a failed port. Some embodiments make several attempts (e.g., 3 attempts) to find an operational port using hash values and if all attempts fail, a backup plan (referred to as plan B) is used to deterministically find an operational port.

Some embodiments maintain a liveness vector. Each WCMP member has a corresponding status bit in the liveness vector. If the member is alive, the corresponding bit value is 1. If the member has failed, the corresponding bit is set to 0. The first part of the hash is used to identify a port. If the port status bit shows that the port is operational the port is used to replace the failed port. Otherwise a second attempt and third attempt are used to find an operational port. Some embodiments makes all these three attempts at the same time and pick the one of the ports based on a predetermined priority. If all three attempts fail, the back up plan is used to look at the bit vector and randomly picks a member that is live.

Figure 23:
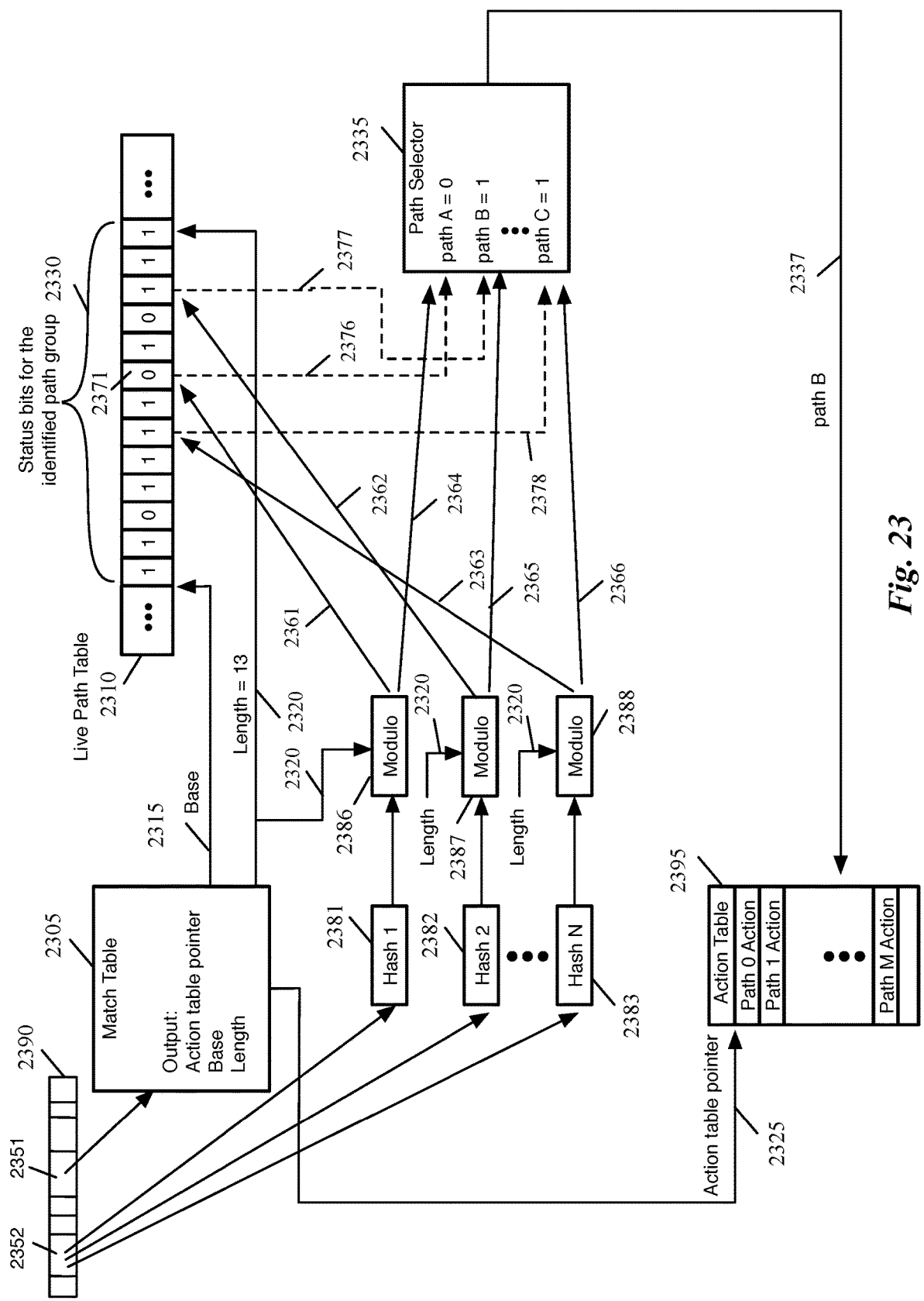
FIG. 23 conceptually illustrates a block diagram of a system for determining an egress port for forwarding a packet in some embodiments.

FIG. 23 conceptually illustrates a block diagram of a system for determining an egress port for forwarding a packet in some embodiments. The system in some embodiments is a network switch (or forwarding element) that implements the processes described above. As shown, for each incoming packet 2390 (e.g., for packet 1405 in FIG. 14) a set of fields 2351 is used to identify a group of paths that is used for forwarding the packet. For instance, some embodiments utilize the OSI Layer 3 (L3) destination address of the packet as an index to the match table 2305 to identify the path group used for forwarding the packets to that destination.

The index is used to identify a set of information (i.e., action table pointer 2325, base 2315, and length 2320) for the port group. Some embodiments hash the set of fields 2351 (e.g., the L3 destination address of the packet) in order to quickly identify the corresponding information for the group of ports. In other embodiments, a set of other fields in a packet header is used to index into match table 2305 to find the information for the group of ports that can be used to forward the packet to its destination. For instance, in some embodiments the port group identification is included in a pre-determined header field of each packet. These embodiments utilize the group identification to index in a match table 2305 in order to identify the port group used for forwarding the packets to that destination.

As shown, a live port (or port representation) table 2310 is used to keep track of weather each configured port in a port group is up or down. The table is conceptually shown to keep a set of status flags, one for each configured path. The status flag (e.g., a bit) corresponding to each configured path is used to show whether the path is up or down. A certain value (e.g., 1) for a status bit indicates that the corresponding path is up. Another value (e.g., 0) indicates that the corresponding path is down.

In addition, the status bits for each port group are kept in a sequence. The base 2315 for each port group points to the beginning of the sequence of status bits for the group and the length 2320 indicates how many ports are configured for the group. For instance, in the example of FIG. 23, base 2315 is pointing to the beginning of the status bits 2330 for the identified port group and the length 2320 indicates that there are 13 ports configured for this group.

Once the port group for the packet 2390 is identified, the hash of a set of fields 2352 (e.g., the n tuple discussed above) is used to identify a port in the port group 2330 for forwarding the packet. Several attempts are made to identify an operational port in the port group (i.e., a port that is up as indicated by the port's corresponding status bit). Although these attempts are conceptually described herein as sequential attempts, as described below all or portions of the decision to identify an operational port is performed by hardware and firmware in parallel.

In the first attempt, a hash function 2381 is used to hash the n tuple 2352 of the packet 2390 to identify a port. The hash value generated by the hash function may be much larger than the number of available ports. For instance, if the hash function generates a 14 bit results, the hash value can be much larger than the 13 available paths in this example. A modulo operation 2386 is therefore performed by dividing the hash value by the length 2320 (which is the number of configured ports in the port group) and using the remainder as an index (as shown by arrow 2361) to identify a port in the live port table 2310.

If the status bit 2371 associated with the identified path indicates that the port is up, the port is selected for forwarding the packet. However, if the identified port is down (as indicated by the value of 0 of the status bit 2371 in the example of FIG. 23), several more attempts are made to identify a port in the port group 2330 that is up.

As shown, in addition to the hash function 2381, several other hash functions 2382-2383 are used to compute hash values for the packet n tuple 2352. Each of the hash functions uses a different hash function in order to calculate different hash values for the same n tuple 2352. Some embodiments perform additional operations to ensure that hash functions 2381-2383 generate different hash values.

In the example of FIG. 23, the hash value generated by hush function 2382 and modulo function 2387 identifies a port (as shown by arrow 2362) that is up (the status bit corresponding to the port is 1). Similarly, the hash value generated by hash function 2383 and modulo function 2388 also identifies a port (as shown by arrow 2363) that is up.

The values of the status bits of the identified ports are input (as shown by arrows 2376-2378) into port selector 2335. The port selector selects a port that is up using a pre-determined priority. For instance, when the port identified by modulo function 2386 is up, the port selector 2335 selects that port for forwarding the packet. Otherwise, if the port identified by modulo function 2387 is up, the port selector 2335 selects that port for forwarding the packet, and so on. When none of the identified ports are up, a fallback technique is used to deterministically identify an operational port as described, below.

In the example of FIG. 23, both ports identified by modulo functions 2387 and 2388 are up (as shown by the value of 1 of the corresponding status bits). The port selector gives a higher priority to the port selected by modulo function 2387 and that port is selected for forwarding the packet.

As shown, the path selector 2335 also receives the results of modulo calculations (as shown by arrows 2364-2366). The port selector utilizes the modulo value used in selecting the path to calculate an index 2337. The action table pointer 2325 points to an action table 2395 that stores identification (e.g., the next hop address or another identification) of the configured ports. For instance, the action table pointer points to a location in the table where the port addresses for the port group identified from match table are stored. The index 2337 is used to identify the address of the port that is selected by the port selector 2335 (in this example port B which was identified by modulo function 2387).

In some embodiments, robust hashing is performed by the next hop selection operation 1413 in FIG. 14. If the next hop selection identifies an egress port and determines that the port is not operational (e.g., by checking the liveness vector), the next hop selection selects an operational port using one of the different methods described herein.

Some embodiments assign a fixed backup port for each egress port. When the egress port fails, the backup port is selected to replace the failed port. Some embodiments use a TCAM to perform a lookup based on the calculated hash value of the n-tuple of a packet header. Another portion of the hash is used to identify the preprogrammed backup port. A worse case of three TCAM entries per WCMP member is needed to identify the egress port and the backup egress port.

Alternatively, some embodiments pick the backup port randomly. In order to create the key for the selection table, a look up is performed based on the hash value. Instead of picking a fixed backup, another hash value is used to create another key for the selection table. Another alternative is to perform range lookup for the selection of the backup port. This alternative requires twice as much TCAM entries as the previous two approaches. The benefit is that the second attempt is also weighted.

II. Computer System

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 24:
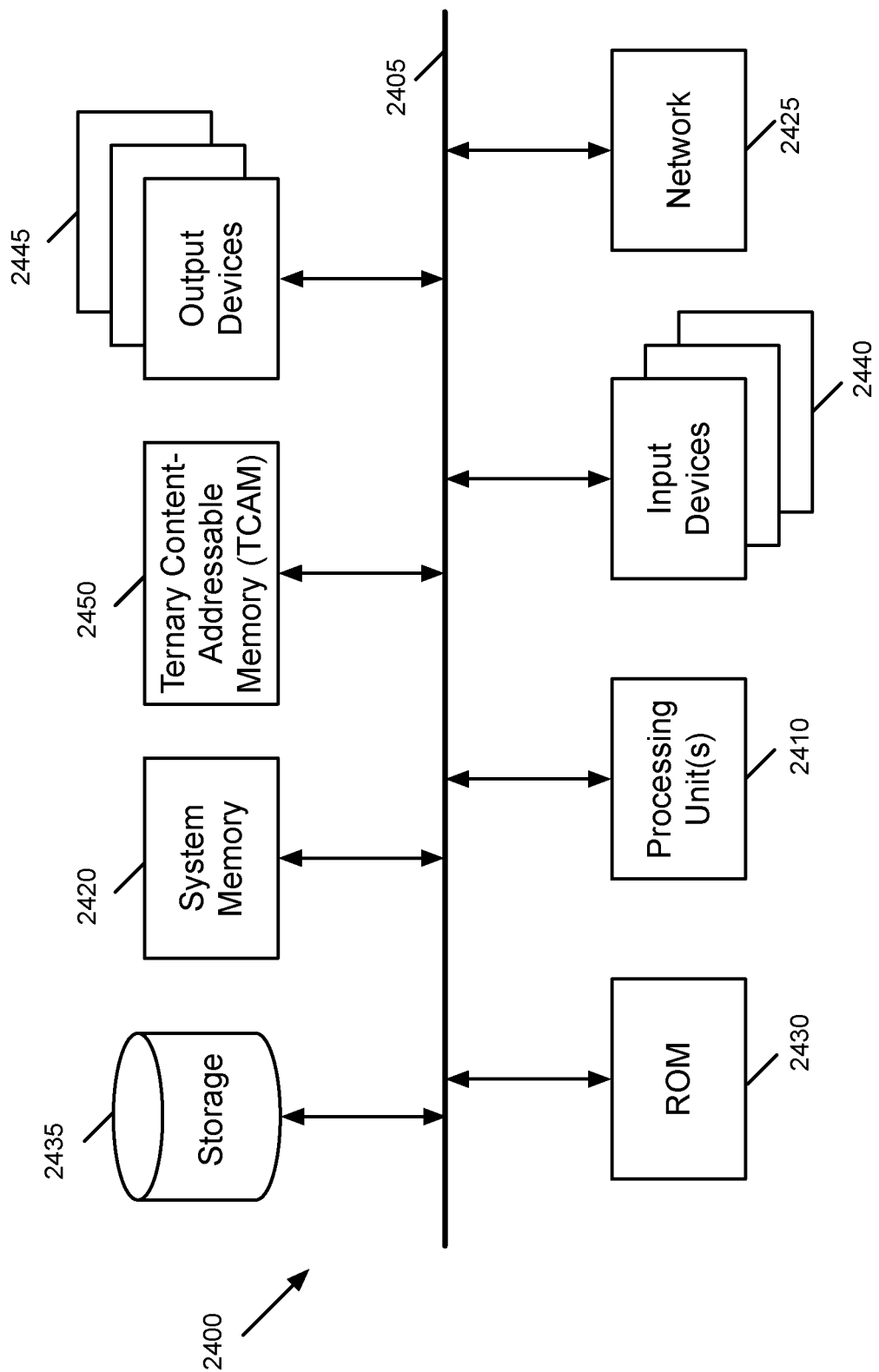
FIG. 24 conceptually illustrates an electronic system with which some embodiments of the invention are implemented.

FIG. 24 conceptually illustrates an electronic system 2400 with which some embodiments of the invention are implemented. The electronic system 2400 can be used to execute any of the control, virtualization, or operating system applications described above. The electronic system 2400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2400 includes a bus 2405, processing unit(s) 2410, system memory 2420, read-only memory (ROM) 2430, permanent storage device 2435, input devices 2440, output devices 2445, and TCAM 2450.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the system memory 2420, and the permanent storage device 2435.

From these various memory units, the processing unit(s) 2410 retrieve instructions to execute and data to process in order to execute the processes of the invention. The processing unit(s) may be a single processor or a multi-core processor in different embodiments.

The read-only-memory 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2435.

Other embodiments use a removable storage device (such as a floppy disk, flash drive, etc.) as the permanent storage device. Like the permanent storage device 2435, the system memory 2420 is a read-and-write memory device. However, unlike storage device 2435, the system memory is a volatile read-and-write memory, such as random access memory. The system memory stores some of the instructions and data that the processor needs at runtime. In some embodiments, the invention's processes are stored in the system memory 2420, the permanent storage device 2435, and/or the read-only memory 2430. From these various memory units, the processing unit(s) 2410 retrieve instructions to execute and data to process in order to execute the processes of some embodiments.

The bus 2405 also connects to the input and output devices 2440 and 2445. The input devices enable the user to communicate information and select commands to the electronic system. The input devices 2440 include alphanumeric keyboards and pointing devices (also called "cursor control devices"). The output devices 2445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 24, bus 2405 also couples electronic system 2400 to a network 2425 through a network adapter (not shown). In this manner, the computer can be a part of a network of computers (such as a local area network ("LAN"), a wide area network ("WAN"), or an Intranet, or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

What is claimed is:

1. A method of forwarding packets by a physical network switch, the method comprising:

identifying a weighted-cost multipathing (WCMP) group associated with a next hop of a received packet, wherein the identified WCMP group is associated with at least one egress port; and applying WCMP in selecting an egress port to use to send the received packet to the next hop based on one or more fields in a header of the received packet, wherein:

an egress port is associated with a weight, the weight indicates a capacity of a path that connects the egress port to the next hop, the weight is normalized over a range of values, the range of values is based on a range associated with one or more fields in received packet headers, and WCMP distributes network packet traffic among next hops in proportion to available capacity of links between the physical network switch and next hops whereby paths are assigned weights based on their capacity and are selected to forward packets with a probability proportional to weight of each path.

2. The method of claim 1, further comprising calculating a value based on a hash of one or more fields in a header of the received packet.

3. The method of claim 2, wherein calculating the value comprises calculating a hash value using one or more of: a source Internet protocol (IP) address, a destination IP address, a source port number, a destination port number, and a protocol used in communicating the received packet.

4. The method of claim 1, wherein identifying a WCMP group associated with a next hop of a received packet comprises identifying a WCMP group based on a destination Internet Protocol (IP) address in the received packet.

5. The method of claim 1, wherein selecting an egress port to use to send the received packet to the next hop based on one or more fields in a header of the received packet comprises:
calculating a value based on a hash of one or more fields in a header of the received packet and
selecting an egress port of the identified WCMP group based on the calculated value being within a range of values associated with the selected egress port.

6. The method of claim 1, comprising:
determining a range of potential hash values from a hash of one or more fields in a header of the received packet;
normalizing the weight over the range of potential hash values; and
assigning a subset of the range of values to an egress port associated with a WCMP group, wherein the range of values comprises the range of hash potential values.

7. The method of claim 1, wherein members of a WCMP group are not replicated within the WCMP group.

8. The method of claim 1, wherein one or more match action units perform the identifying and using a value to select an egress port.

9. The method of claim 1, wherein the next hop comprises a next network switch or router in a path of the received packet to the received packet's final destination.

10. The method of claim 1, further comprising:
assigning egress ports that connect the physical network switch to a particular next hop destination to a second WCMP group associated with the particular next hop destination;
assigning weights to at least one egress port in the second WCMP group according to a capacity of a path that connects an egress port to a next hop associated with the second WCMP group; and
normalizing the weights over a range of values.

11. The method of claim 1, comprising:
based on failure of an egress port, removing the failed egress port from the WCMP group and adjusting weights for remaining egress ports.

12. A hardware network switch, the hardware network switch comprising: a processor; a memory; and a set of ingress pipelines, at least one ingress pipeline configured to:
identify a weighted-cost multipathing (WCMP) group associated with a next hop of a received packet, wherein the identified WCMP group is associated with at least one egress port; and
apply WCMP to select an egress port to use to send the received packet to the next hop based on one or more fields in a header of the received packet, wherein:
an egress port is associated with a weight,
the weight indicates a capacity of a path that connects the egress port to the next hop,
the weight is normalized over a range of values,
the range of values is based on a range associated with one or more fields in received packet headers, and
WCMP distributes network packet traffic among next hops in proportion to available capacity of links between the hardware network switch and next hops whereby paths are assigned weights based on their capacity and are selected to forward packets with a probability proportional to a weight of each path.

13. The switch of claim 12, wherein the at least one ingress pipeline is configured to:
calculate a value based on a hash of one or more fields in a header of the received packet.

14. The switch of claim 13, wherein to calculate the value, the at least one ingress pipeline is to calculate a hash value using one or more of: a source Internet protocol (IP) address, a destination IP address, a source port number, a destination port number, and a protocol used in communicating the received packet.

15. The switch of claim 12, wherein apply WCMP to select an egress port to use to send the received packet to the next hop based on one or more fields in a header of the received packet comprises:
calculate a value based on a hash of one or more fields in a header of the received packet and
select an egress port of the identified WCMP group based on the calculated value being within a range of values associated with the selected egress port.

16. The switch of claim 12, wherein members of a WCMP group are not replicated within the WCMP group.

17. The switch of claim 12, comprising one or more match action units to identify a WCMP group and select an egress port to use.

18. The switch of claim 12, wherein the next hop comprises a next network switch or router in a path of the received packet to the received packet's final destination.

19. The switch of claim 12, further comprising a traffic manager and a set of egress pipelines.

* * * * *